(12) United States Patent
Imanishi et al.

(10) Patent No.: US 9,644,774 B2
(45) Date of Patent: May 9, 2017

(54) WELDING JOINT AND WELDING METHOD FOR SAME, WELDING DEVICE, WELDING JOINT, RESIN PIPE WELDING DEVICE AND WELDING METHOD

(75) Inventors: Ryo Imanishi, Fukuchiyama (JP); Masaru Misaki, Sanda (JP); Masateru Yamada, Sanda (JP); Takehiro Nakamura, Sanda (JP); Akihiro Masuda, Fukuchiyama (JP)

(73) Assignee: NIPPON PILLAR PACKING CO., LTD., Osaka-Shi (JP)

( * ) Notice: Subject to any disclaimer, the term of this patent is extended or adjusted under 35 U.S.C. 154(b) by 903 days.

(21) Appl. No.: 13/642,291

(22) PCT Filed: Apr. 1, 2011

(86) PCT No.: PCT/JP2011/058426
§ 371 (c)(1),
(2), (4) Date: Oct. 19, 2012

(87) PCT Pub. No.: WO2011/132519
PCT Pub. Date: Oct. 27, 2011

(65) Prior Publication Data
US 2013/0038053 A1   Feb. 14, 2013

(30) Foreign Application Priority Data

Apr. 22, 2010 (JP) ................. 2010-098674
May 11, 2010 (JP) ................. 2010-109428
(Continued)

(51) Int. Cl.
*F16L 47/02* (2006.01)
*B29C 65/14* (2006.01)
(Continued)

(52) U.S. Cl.
CPC .............. *F16L 47/02* (2013.01); *B29C 65/14* (2013.01); *B29C 65/1467* (2013.01);
(Continued)

(58) Field of Classification Search
CPC .... F16L 47/02; F16L 47/03; B29C 66/73921; B29C 66/818
(Continued)

(56) References Cited

U.S. PATENT DOCUMENTS 5,462,313 A * 10/1995 Rea ................... B29C 66/52296
156/158
6,629,551 B1   10/2003 Johnson et al.
(Continued)

FOREIGN PATENT DOCUMENTS

JP   9-170692   6/1997
JP   10-138346   5/1998
(Continued)

*Primary Examiner* — David E Bochna
(74) *Attorney, Agent, or Firm* — Rankin, Hill & Clark LLP

(57) ABSTRACT

A synthetic resin-made welding joint that has a pipe end portion into which an end portion of a synthetic resin-made tube is to be fitted and inserted, and that is configured so that the pipe end portion and the tube end portion which is fitted and inserted thereinto are enabled to be welded together by heating of heating means which externally surrounds the pipe end portion, therefore, a synthetic resin-made holder which is fitted and attached onto the pipe end portion is disposed, and a flange for ensuring a radial expansion gap with respect to the heating means is integrally formed in the holder.

4 Claims, 21 Drawing Sheets

(30) Foreign Application Priority Data

Nov. 10, 2010 (JP) .................................. 2010-251773
Mar. 9, 2011 (JP) .................................. 2011-050996

(51) Int. Cl.
  *B29C 65/18* (2006.01)
  *B29C 65/78* (2006.01)
  *B29C 65/00* (2006.01)

(52) U.S. Cl.
  CPC .......... *B29C 65/18* (2013.01); *B29C 65/7832* (2013.01); *B29C 65/7844* (2013.01); *B29C 66/1222* (2013.01); *B29C 66/1224* (2013.01); *B29C 66/3242* (2013.01); *B29C 66/5221* (2013.01); *B29C 66/52231* (2013.01); *B29C 66/52241* (2013.01); *B29C 66/52292* (2013.01); *B29C 66/73521* (2013.01); *B29C 66/73921* (2013.01); *B29C 66/818* (2013.01); *B29C 66/81821* (2013.01); *B29C 66/81831* (2013.01); *B29C 66/8324* (2013.01); *B29C 66/83241* (2013.01); *B29C 66/861* (2013.01); *B29C 66/92651* (2013.01); *B29C 66/954* (2013.01); *B29C 65/1412* (2013.01); *B29C 66/0042* (2013.01); *B29C 66/71* (2013.01); *B29C 66/73116* (2013.01); *B29C 66/8122* (2013.01)

(58) Field of Classification Search
  USPC .................... 285/41, 187, 285.1, 381.1, 382, 285/382.4–382.5, 909, 919, 21.2, 288.1
  See application file for complete search history.

(56) References Cited

U.S. PATENT DOCUMENTS

| | | | |
|---|---|---|---|
| 7,618,070 B2 * | 11/2009 | Stoll | F16L 47/02 285/288.1 |
| 2003/0192641 A1 * | 10/2003 | Espejo | B29C 66/5221 156/272.4 |
| 2004/0201212 A1 * | 10/2004 | Marks | F16L 47/02 285/124.1 |
| 2004/0206741 A1 | 10/2004 | Nakagawa | |
| 2008/0014396 A1 | 1/2008 | Nakagawa et al. | |

FOREIGN PATENT DOCUMENTS

| | | |
|---|---|---|
| JP | 2002-542072 | 12/2002 |
| JP | 2004-167884 | 6/2004 |
| JP | 2004-195887 | 7/2004 |
| JP | 2007-278396 | 10/2007 |
| JP | 2008-069880 | 3/2008 |

\* cited by examiner

Fig. 2
(a)
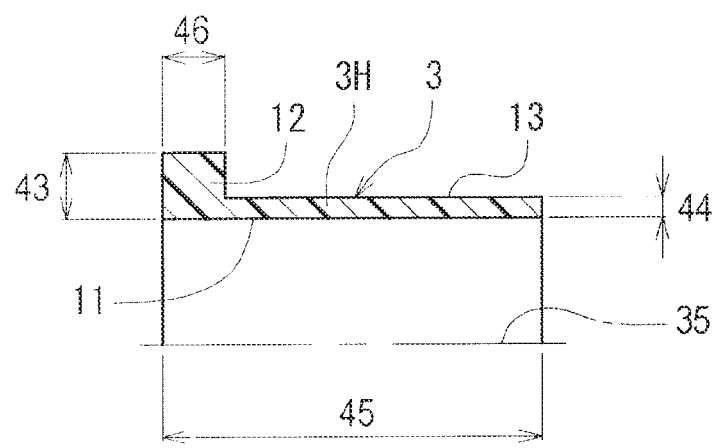
(b)
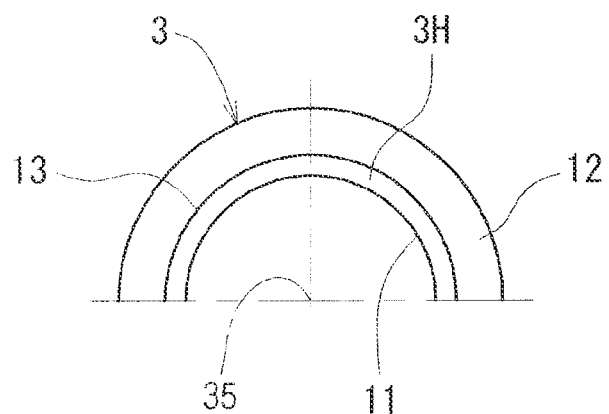

Fig. 3
(a)
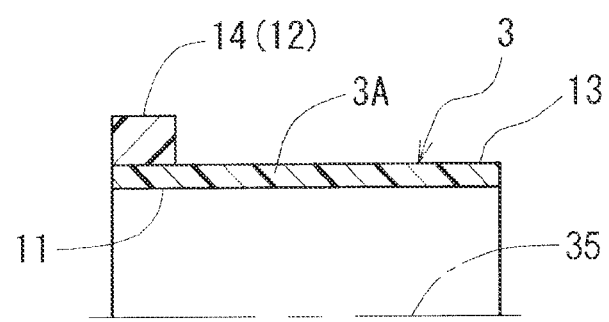
(b)
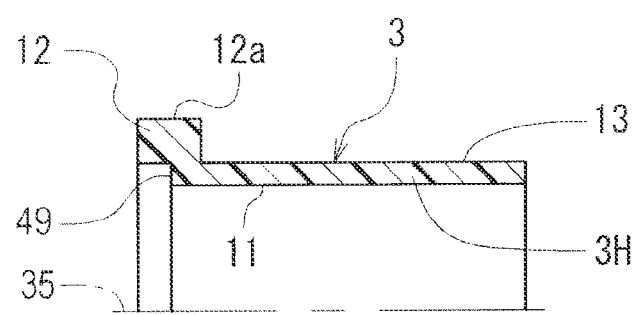
(c)
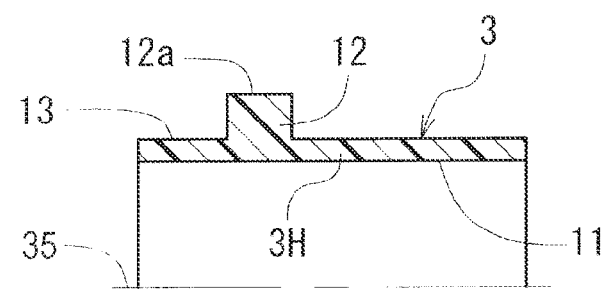

Fig. 4
(a)
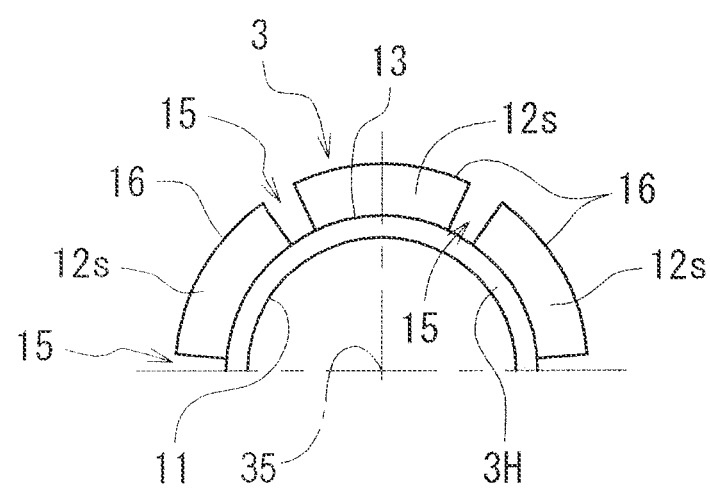
(b)
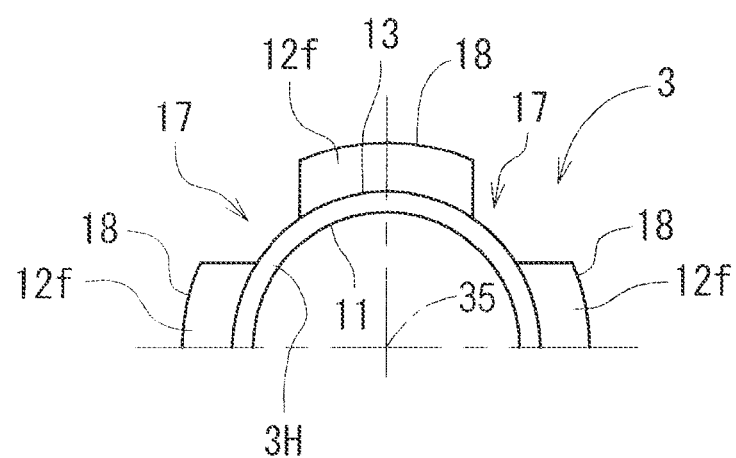

Fig. 5
(a) 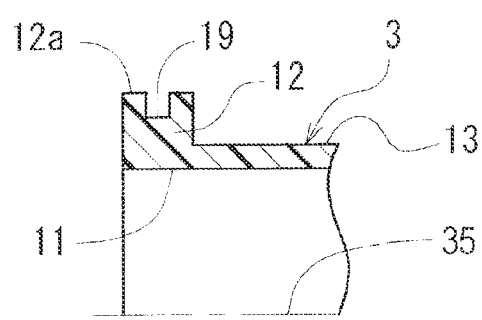
(b) 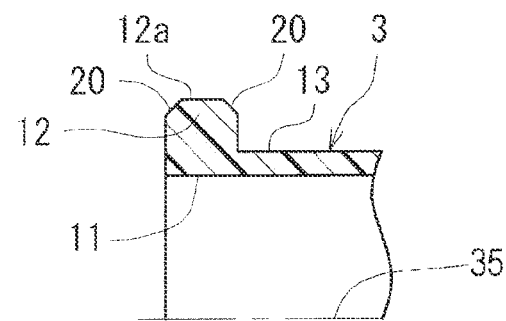
(c) 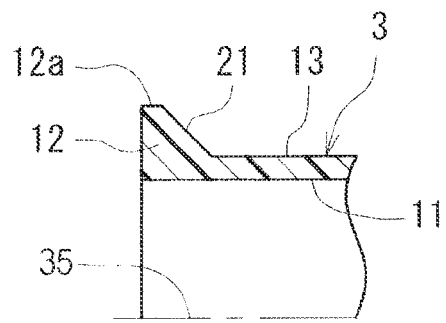
(d) 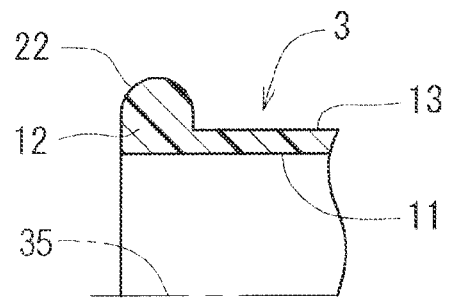

Fig. 8
(a) 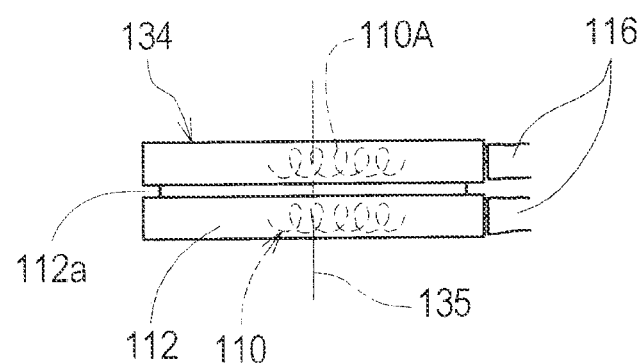
(b) 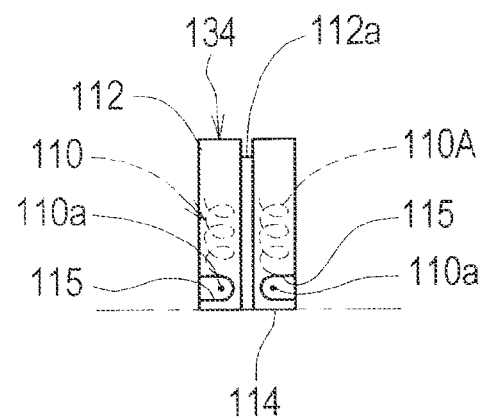
(c) 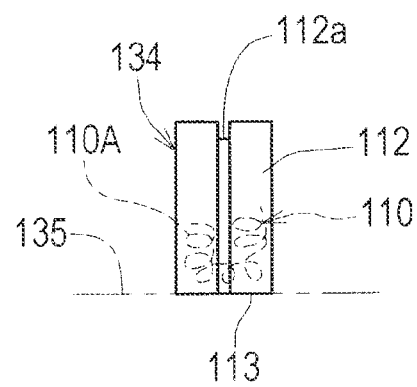

Fig. 15
(a)
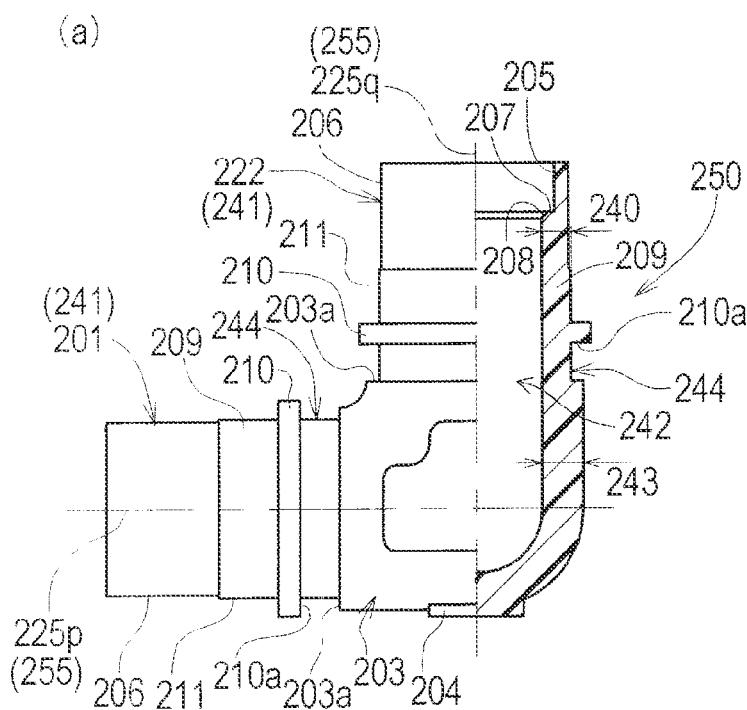
(b)
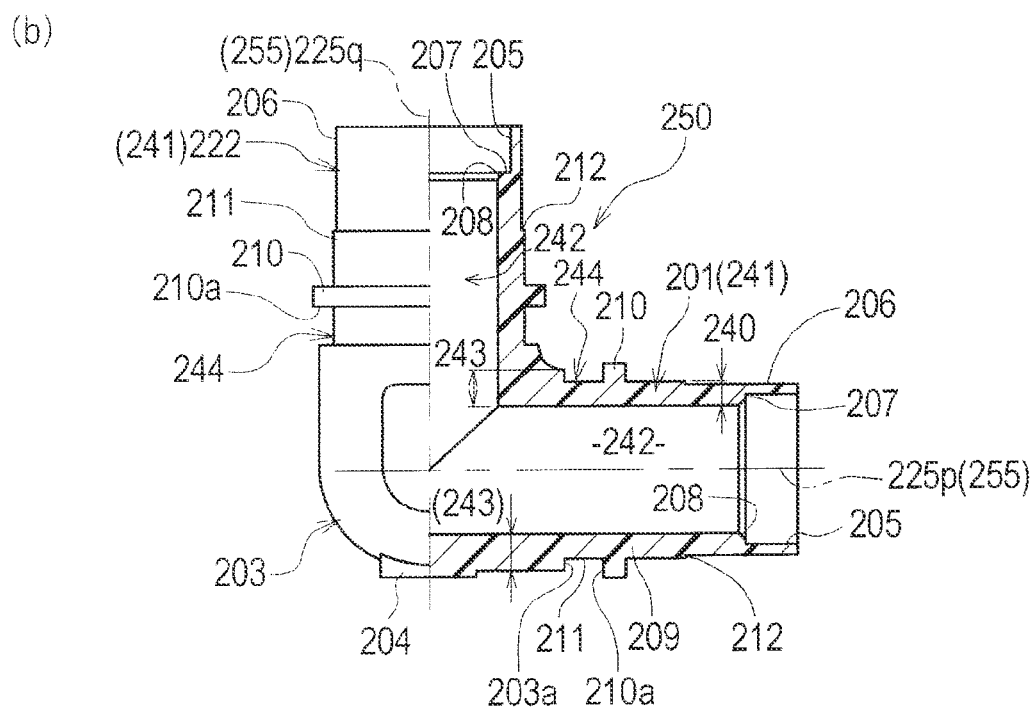

Fig. 19
(a)
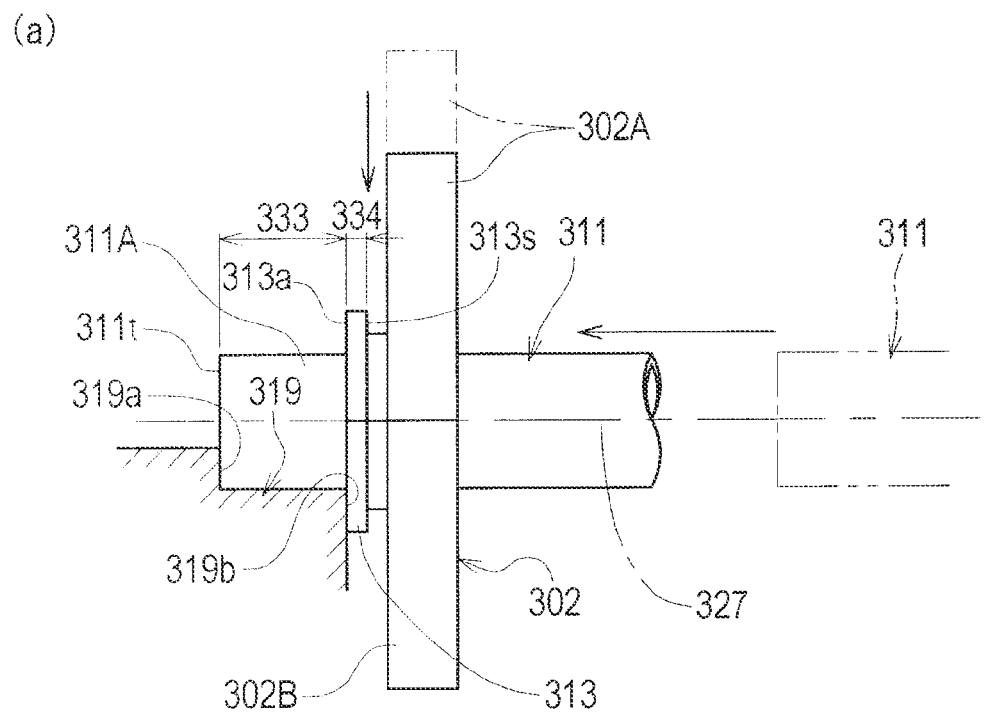
(b)
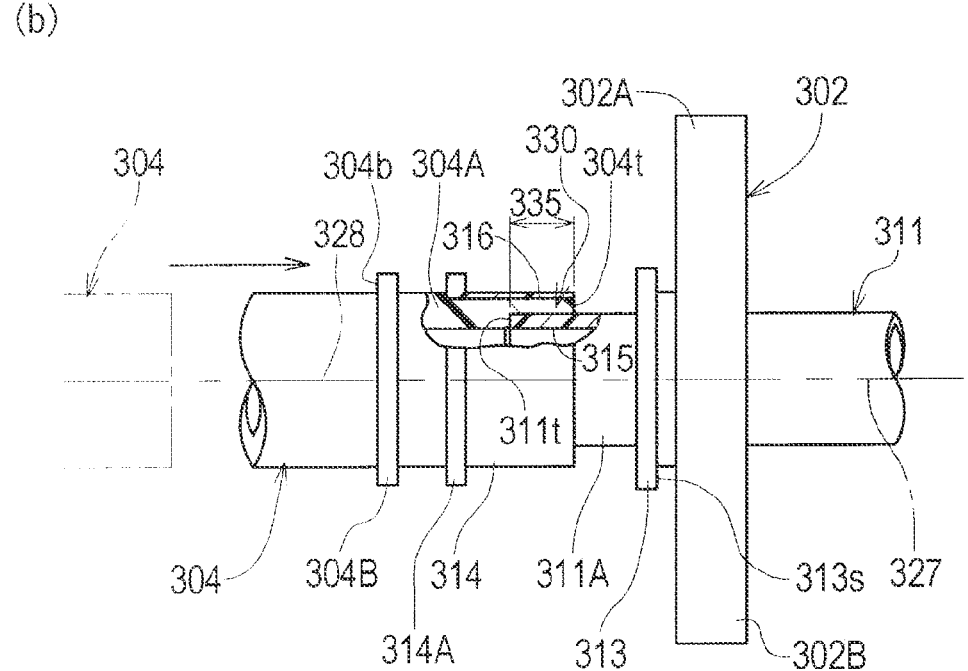

WELDING JOINT AND WELDING METHOD FOR SAME, WELDING DEVICE, WELDING JOINT, RESIN PIPE WELDING DEVICE AND WELDING METHOD

TECHNICAL FIELD

One aspect of the invention relates to a welding joint and a method of welding it, and more particularly to a synthetic resin-made welding joint that has a pipe end portion into which an end portion of a synthetic resin-made tube is to be fitted and inserted, and that is configured so that the pipe end portion and the end portion which is fitted and inserted thereinto are enabled to be welded together by heating of heating means which externally surrounds the pipe end portion, and also to a method of welding it.

Another aspect of the invention relates to an apparatus for welding a resin joint with a resin tube, and more particularly to a welding apparatus that has a heating portion externally surrounding a joining portion in which a pipe end portion of a synthetic resin-made welding joint and an end portion of a synthetic resin-made tube are fitted together, and that is configured so that the joining portion is heated and welded by heating of the heating portion, whereby the pipe end portion and the end portion can be welded together.

Yet another aspect of the invention relates to a welding joint, and more particularly to a synthetic resin-made welding joint that has: a pipe end portion into which an end portion of a synthetic resin-made tube is to be fitted and inserted; and a joint body portion having a straight pipe-like outer shape which is continuous to the pipe end portion, and that is configured so that heating of a heating means externally surrounding the pipe end portion enables the pipe end portion and the tube end portion which is fitted and inserted thereinto, to be welded together.

Still yet another aspect of the invention relates to an apparatus for welding a resin pipe and a welding method, and more particularly to an apparatus for welding a resin pipe that has a heating portion externally surrounding a joining portion in which a pipe end portion of a synthetic resin-made welding joint and a tube end portion of a synthetic resin-made tube are fitted together, and that is configured so that the joining portion is heated and welded by heating of the heating portion, whereby the pipe end portion and the tube end portion can be welded together, and also to a welding method using the welding apparatus.

BACKGROUND ART

As a welding joint of this kind, known is a welding joint disclosed in Patent Literature 1. The literature relates to an apparatus for welding a welding joint in which, when a synthetic resin-made welding joint and a synthetic resin-made tube are to be welded together, the welding joint can be fixed so as not to be displaced. According to the disclosure, a joining portion in which a pipe end portion of the welding joint and an end portion of the tube are fitted together is externally surrounded and heated by an annular heater (welding head) having a half-split structure, whereby the both end portions are welded together to integrally couple the joint with the tube.

In the above-described conventional art, the joining portion is externally surrounded so that it is just externally fitted by the annular heater, and it is advantageous that the joining portion can be efficiently heated. However, it has been known that the art has a chronic problem. Namely, the problem is that, when means for heating resins to melt and integrally weld together is used, the welded portion expands, and hence the joining portion wholly expands toward the radially inner side, or a weld bead which projects toward the radially inner side is formed, and a fluid passage is narrowed to impair the passage.

As a countermeasure against the problem, as disclosed in Patent Literature 2, a technique has been developed in which heating and welding are enabled to be performed without forming a bead or an expanded portion inside a joining portion, by ingenuity that, in both joining portions of a welding joint and a tube, each of end surfaces is formed by a plurality of sectional surfaces so that a gap is formed between them in a butted state.

However, the formation in which the pipe end portions of the welding joint and the tube are formed into a complicated shape involves large costs, but not always functions as expected. The case where a bead or an expanded portion is formed still sometimes occurs. In certain instances, a recess may be formed. There remains room for further improvement in smoothing an internal flow path in the joining portions.

As a welding apparatus of this kind, known is an apparatus disclosed in Patent Literature 3. In the welding apparatus, a pair of clampers (30) are supported so as to be swingable between a closing position where a joining portion (T1) is clamped from the both sides through a pair of heat conductive members (20), and an opening position where a gap between the pair of heat conductive members (20) is widened, a pair of heaters (40) are formed so as to extend along the pair of heat conductive members (20) by planer resistance heating members, respectively, and the joining portion (T1) is heated through the pair of heat conductive members (20).

Namely, the heaters (40) have a substantially Ω-like shape including a semicircular middle portion (41) which is placed on a radially outer side of the heat conductive member (20), and planar end portions (45) which are continuous to the both ends of the member. A lead wire is connected to one of the end portions (45), and the other ends are conductively connected in series to each other by a junk wire (67). The pair of heat conductive members (20) have a semi-tubular shape because of the cost and process easiness. Although description and illustration are omitted in Patent Literature 3, in order to prevent the end portions (45) of the heaters (40) from being short-circuited at the closing position, it is necessary that a physical gap of a certain degree is formed, and an insulation material is inserted into the gap. This tendency is similarly observed also in a welding apparatus disclosed in Patent Literature 4.

As a schematic diagram of a heating portion 140 at the closing position shown in FIG. 10, namely, circumferential gaps 147 are formed in the radially outer side of split surfaces (coupling surfaces) 146 of the heat conductive members 143 in the space between the end portions 142, 142 of the heaters 141 in the circumferential direction, and the insulation material (for example, a ceramic, mica, or glass) 144 is interposed. In the conventional example, because of the existence of the gaps 147 at the both ends of the half-split heaters 141, the joining portion 148 tends to be non-uniformly heated, so that the welded state is hardly stabilized, and the insulation material 144 must be periodically maintained and inspected, so that the heaters are not maintenance-free and their handling is cumbersome.

In welding joints of this kind, many joints having a shape other than a linear shape, such as an elbow shape (L-like shape), a T-like shape, and a Y-like shape are used. Among welding joints disclosed in Patent Literature 5, for example, an elbow shape is shown in FIG. 25, and a T-like shape is shown in FIG. 26. In such a welding joint having a shape other than a linear shape, i.e., a non-linear shape, in order to provide sufficient durability also in various usage modes, it is requested to withstand a severer acceleration test machine in tests in the productization stage.

Usually, a synthetic resin-made welding joint is produced by mold forming. In a welding joint having a T-like shape, a port for supplying molten resin, i.e., a so-called sprue gate is disposed in a body portion functioning as a base for three pipe end portions, and, in a welding joint having an elbow shape, in a curbed body portion through which a pair of pipe end portions are connected to each other. It has been known that, when such a welding joint is applied to the acceleration test machine, a crack or a break is easily formed along the sprue gate portion or a parting line in an early stage.

It is contemplated that, in order to improve the above-described early damage, means for thickening a sprue gate and the vicinity thereof in place of making uniform the thickness of a welding joint is effective. In this case, a thickness gradually changing structure in which the thickness is gradually increased is preferably used from the viewpoint of avoiding stress concentration as far as possible. However, there is an advantage which can be obtained by daringly forming a sudden change in thickness. Namely, as shown in a comparative example of FIG. 14, for example, the advantage is that, in a welding joint 260 of the T-like shape, a step 203a formed by the thickness difference between a joint body portion 203 and a pipe end portion 241 can be used as positioning means in a welding apparatus 270. This is a rational structure which can exert also an effect that means (the increased thickness of the joint body portion 203) for preventing an early damage from occurring can be used also as means for positioning in welding.

Namely, it is rational that means for holding the pipe end portion by a second sidewall 280 having an inner circumferential surface 280a of a width which is large to some extent in the direction of the axis 225p, to clamp the pipe end portion, as shown in FIG. 14, is used as means for grasping the pipe end portion 241 in the welding apparatus 270, and the second sidewall 280 is caused to abut against the step 203a for the purpose of positioning. In addition, a space portion 281 functioning as a minimum buffer region for relaxing the heat effect is formed in a gap between heating means (heater) 214 for welding and the second sidewall 280 in the direction of the axis 225p. Therefore, the length of the pipe end portion 241 in the direction of the axis 225p excluding the portion corresponding to the heating means 214 must be equal to or larger than a projection length 295 (=246+297) which is a sum of the width 297 of the second sidewall 280 and the width 246 of the space portion 281.

Although, as described above, the improved welding joint (the welding joint 260 shown in FIG. 14) having the rational structure which can attain at once both (a) the effect of preventing an early damage from occurring in the sprue gate portion or the parting line, and (b) the effect of functioning also as welding positioning means is assumed, it seems that the pipe end portion 241 is unnecessarily prolonged. Therefore, it seems that there remains room for further ingenuity, such as that the pipe end portion 241 can be compactified by making further improvement.

As an apparatus for welding a resin pipe and welding method of this kind, known are an apparatus and method disclosed in Patent Literature 6. Namely, the apparatus has a welding head (10) including a clamper (30) which can position and hold a resin joint (100), and a heating portion (40) which heats a joining portion (J). The clamper (30) has a joint holding portion (31) which is fitted to a position projecting portion (110) of the resin joint (100), and is supported so as to be swingable between a closing position where the clamper is closed so that a joint holding portion (31) is fitted to the position projecting portion (110), and an opening position where the clamper is opened so that the fitting can be cancelled. Then, the heating portion (40) is placed so as to, at the closing position, surround the joining portion (J). The joining portion (J) is heated and welded by the heating portion (40) while holding the resin joint (100) is positioned by the joint holding portion (31) in a state where the resin joint (100) is positioned by the joint holding portion (31).

The above welding apparatus and method will be described in a simplified manner. As shown in FIG. 21, a welding apparatus 370 has a joint holding portion 375 which externally surrounds and holds a welding joint 374, and a tube holding portion 376 which externally surrounds and holds a tube 381, and heating means (heater) 377 in a state where it is fitted onto a holder 384 which is externally attached to a pipe end portion 374A of the welding joint 374 is placed between the holding portions 375, 376. The joint holding portion 375, the tube holding portion 376, and the heating means 377 are configured in a known structure where lower structural members 375k, 376k, 377k and upper structural members 375j, 376j, 377j are pivotally coupled together, and the three members 375, 376, 377 are integrally swung to be opened and closed.

When a joining portion 382 of the welding joint 374 and the tube 381 is to be melted and welded together, an inserting step of inserting (internally fitting) an end portion 381A of the tube 381 into the pipe end portion 374A of the welding joint 374 onto which the holder 384 is fitted is first performed. Then, a setting step of positioning and placing the welding joint 374 accompanied by the tube 381 on the lower structural members 375k, 376k, 377k in a state where an annular ridge (positioning annular rib) 374B of the joint is fitted into a semiannular recess groove 388 of the lower structural members 375k of the joint holding portion 375 is performed.

Then, a checking and inserting step of inserting the tube 381 into the welding joint 301 until an end surface 381t which is the tip end surface of tube abuts against a step side surface 374c of the pipe end portion 374A is performed, and thereafter an attaching step of downward swinging the upper structural members 375j, 376j, 377j to be engagedly coupled to the lower structural members 375k, 376k, 377k, and causing the joint holding portion 375 to clampingly hold the welding joint 374, and the tube holding portion 376 to clampingly hold the tube 381 is performed. Then, a welding step of causing the heating means 377 to operate to melt the joining portion 382, and integrally welding the pipe end portion 374A of the welding joint 374 with the end portion 381A of the tube 381 is performed.

By the way, in order to correctly perform the welding, it is essential to, in the checking and inserting step, set the tube 381 to a state where the tube end surface 381t abuts against the step side surface 374c of the welding joint 374 and the both surfaces 381t, 374c are in contact with each other (the state which is drawn in the side of the sheet that is lower than the center line 385 in FIG. 21), and perform the attaching step under the abutting state. However, because of defectiveness of the checking and inserting step in which checking and inserting are frequently performed in a fuzzy manner, or a fault in which, in the attaching step, the tube 381 is slightly displaced in the pulling out direction, as drawn in the side of the sheet that is higher than the center line 385 in FIG. 21, the step side surface 374c and the end surface 381t are sometimes welded while they are separated from each other in the direction of the center line 385 and a gap (annular gap) 389 is formed.

When the gap 389 is formed, a disadvantage such as that a fluid stagnates therein, or that a foreign material or dust collects therein occurs. In the case of a fluid in which high cleanness is requested, such as cleaning liquid for semiconductor devices, or chemical liquid, particularly, a serious problem in that the purity is lowered by stagnation may be caused. In the conventional apparatus and method in which a tube is welded to the joint body at the initial position depending on the feeling of the worker at the site as described above, the welding is uncertain, and there remains room for improvement.

PRIOR ART LITERATURE

Patent Literature

Patent Literature 1: Japanese Patent Application Laid-Open No. 2008-069880
Patent Literature 2: Japanese Patent Application Laid-Open No. 2007-239973
Patent Literature 3: Japanese Patent No. 4109540
Patent Literature 4: Japanese Patent Application Laid-Open No. 2008-069880
Patent Literature 5: Japanese Patent Application Laid-Open No. 7-144367
Patent Literature 6: Japanese Patent Application Laid-Open No. 2008-069880

SUMMARY OF THE INVENTION

Problems to be Solved by the Invention

It is a first object of the invention to provide a welding joint in which, in a joining portion configured by fitting and insertion of a pipe end portion and a tube end portion, inward expansion and bead formation due to heat welding are suppressed as far as possible or cancelled by further ingenuity of the structure, and which is improved so that welding and integration are satisfactorily enabled without causing a fluid passing resistance, and a method of welding it.

It is a second object of the invention to provide a welding apparatus which, although preserving a heating portion configured by a simple structure having a pair of half-split heaters, is improved by further ingenuity so that a stable welding situation due to more uniform heating is realized, an insulation material is made unnecessary, and maintenance free is enabled.

It is a third object of the invention that a welding joint having a non-linear shape is enabled to be provided as a further improved and rationalized joint in which a configuration where a joint body portion is thickened is effectively used so as to exert the above-described effects (a) and (b), and a pipe end portion is enabled to be compactified while maintaining necessary functions.

It is a fourth object of the invention to provide an apparatus for welding a resin pipe and welding method which are improved so that, when a joining portion is to be melted to weld a pipe end portion and a tube end portion together, a normal insertion state where a tube end surface abuts against a step side surface of a welding joint is attained, and a disadvantage that, because of insufficient insertion of the welding joint and the tube, a gap is formed between the step side surface and the tube end surface does not occur.

Means for Solving the Problems

Aspect 1 of the invention is a synthetic resin-made welding joint that has a pipe end portion 2T into which an end portion 1T of a synthetic resin-made tube 1 is to be fitted and inserted, and that is configured so that the pipe end portion 2T and the end portion 1T which is fitted and inserted thereinto are enabled to be welded together by heating of heating means 4 which externally surrounds the pipe end portion 2T, wherein
a synthetic resin-made holder 3 which is fitted and attached onto the pipe end portion 2T is disposed, and a flange 12 for ensuring a radial expansion gap 41 with respect to the heating means 4 is formed in the holder 3.

Aspect 2 of the invention is characterized in that, in the welding joint according to aspect 1, the flange 12 is placed in an end of the holder 3 on a side of a joint inner deep side in a direction of an axis 35.

Aspect 3 of the invention is characterized in that, in the welding joint according to aspect 1 or 2, a radial thickness of the flange 12 is set to 1.4 to 15 times a radial thickness of a portion of the holder 3 other than the flange.

Aspect 4 of the invention is characterized in that, in the welding joint according to any one of aspects 1 to 3, a length of the holder 3 in a direction of an axis 35 is set to 2 to 10 times a length of the flange 12 in the direction of the axis 35.

Aspect 5 of the invention is characterized in that, in the welding joint according to any one of aspects 1 to 4, a resin having a melting temperature which is higher than a melting temperature of a synthetic resin forming the pipe end portion 2T is set as the synthetic resin forming the holder 3.

Aspect 6 of the invention is a method of welding a welding joint in which a pipe end portion 2T of a synthetic resin-made welding joint 30, and an end portion 1T of a synthetic resin-made tube 1 that is to be fitted and inserted into the pipe end portion 2T are welded together by heating by an annular heater 4 that is placed in a state where the heater externally surrounds the pipe end portion 2T, wherein
the annular heater 4 is placed and caused to heat in a state where a synthetic resin-made holder 3 is fitted and attached onto the pipe end portion 2T, and a predetermined radial gap 41 is formed with respect to an outer circumferential surface 13 of the holder.

Aspect 7 of the invention is characterized in that, in the method of welding a welding joint according to aspect 6, a flange 12 which is projected by a predetermined length in an radially outward direction is formed in the holder 3, and heating is performed in a state where the annular heater 4 is in external contact with the flange 12.

Aspect 8 of the invention is a welding apparatus that has a heating portion 103 externally surrounding a joining portion 118 in which a pipe end portion 104 of a synthetic resin-made welding joint 120 and an end portion 106 of a synthetic resin-made tube 105 are fitted together, and that is configured so that the joining portion 118 is heated and welded by heating of the heating portion 103, whereby enabling the pipe end portion 104 and the end portion 106 to be welded together, wherein
the heating portion 103 is configured by an annular portion in which a pair of half-split heaters h which are used for heating the joining portion, and each of which has a substantially semicircular inner circumferential surface 107 are arranged in a circumferential direction, and each of the half-split heaters 134 has: a heat transmitting case 109 which is made of an insulative heat conductive material, and which exhibits a substantially semicircular shape; and a heating element 110 which is housed in the heat transmitting case 109 in a state where the element is taken out in one end portion of the heat transmitting case 109 in the circumferential direction, and folded back in another end in the circumferential direction.

Aspect 9 of the invention is characterized in that, in the welding apparatus according to aspect 8, the half-split heaters 134 are pivotally coupled to each other to be swing-openable and closable about a fulcrum 119 which is disposed on a side of the one end portion or a side of the other end portion, and configured to be switchable between an opened state where the heaters are swung to be opened to enable the joining portion 118 to enter and exit the heating portion 103, and a closed state where the heaters are swung to be closed to allow the inner circumferential surfaces 107 to externally surround and heat the joining portion 118.

Aspect 10 of the invention is characterized in that, in the welding apparatus according to aspect 9, the fulcrum 119 is set on a side of the one end portion of each of the half-split heaters 134.

Aspect 11 of the invention is characterized in that, in the welding apparatus according to any one of aspects 8 to 10, the heating element 110 is a coil heater.

Aspect 12 of the invention is characterized in that, in the welding apparatus according to any one of aspects 8 to 10, the insulative heat conductive material of the heat transmitting case 109 is a ceramic.

Aspect 13 of the invention is a synthetic resin-made welding joint that has: a pipe end portion 241 into which an end portion 213a of a synthetic resin-made tube 213 is to be fitted and inserted; and a joint body portion 203 having a straight pipe-like outer shape which is continuous to the pipe end portion 241, and that is configured so that welding of the pipe end portion 241 and the tube end portion 213a which is fitted and inserted thereinto is enabled by heating of heating means 214 externally surrounding the pipe end portion 241, wherein a thickness difference which causes a thickness 243 of the joint body portion 203 to be larger than a thickness 240 of the pipe end portion 241 is disposed, an annular end surface 203a due to the thickness difference is formed in a boundary of the joint body portion 203 with the pipe end portion 241, and a projection 210 which forms a recess groove 244 with respect to the end surface 203a while using an outer circumferential surface of the pipe end portion 241 as a bottom surface is disposed integrally with the pipe end portion 241.

Aspect 14 of the invention is characterized in that, in the welding joint according to aspect 13, the projection 210 is an annular ridge with respect to an axis 255 of the pipe end portion 241, and the circumferential recess groove 244 is formed with respect to the end surface 203a of the joint body portion 203.

Aspect 15 of the invention is characterized in that, in the welding joint according to aspect 13 or 14, the joint has a T-like shape in which a second pipe end portion 241 that is identical in structure with the pipe end portion 241, and that has the same axis 255, and a third pipe end portion 241 that is identical in structure with the pipe end portion 241, and that has an axis 255 intersecting with the axis 255 are connected to the joint body portion 203.

Aspect 16 of the invention is characterized in that, in the welding joint according to aspect 13 or 14, the joint has an L-like shape in which a second pipe end portion 241 that is identical in structure with the pipe end portion 241, and that has an axis 255 intersecting with the axis 255 is connected to the joint body portion 203.

Aspect 17 of the invention is characterized in that, in the welding joint according to aspect 13 or 14, the joint is made of a fluorine resin.

Aspect 18 of the invention is an apparatus for welding a resin pipe that has a heating portion 307 externally surrounding a joining portion 330 in which a pipe end portion 304A of a synthetic resin-made welding joint 304 and a tube end portion 311A of a synthetic resin-made tube 311 are fitted together, and that is configured so that the joining portion 330 is heated and melted by heating of the heating portion 307, to enable the pipe end portion 304A and the tube end portion 311A to be welded together, wherein the apparatus has: a clamp 302 which is surroundingly engageable with the tube 311 in a place that is separated by a predetermined distance from a tube end surface 311t of the tube; and a welding apparatus body 301 which is engageable with the clamp 302 in a state where a relative position in a longitudinal direction of the tube is determined.

Aspect 19 of the invention is characterized in that, in the apparatus for welding a resin pipe according to aspect 18, positioning means 321 which, in an engaging portion 306 where the clamp 302 and the welding apparatus body 301 are relatively engaged with each other, determines the relative position in the longitudinal direction of the tube between the clamp 302 and the welding apparatus body 301 is configured by distributing an annular ridge 313 and annular recess groove 317 which are fittable to each other, to the clamp 302 and the welding apparatus body 301.

Aspect 20 of the invention is characterized in that, in the apparatus for welding a resin pipe according to aspect 19, the positioning means 321 is configured by the annular ridge 313 formed in the clamp 302, and the annular recess groove 317 formed in the welding apparatus body 301.

Aspect 21 of the invention is characterized in that, in the apparatus for welding a resin pipe according to any one of aspects 18 to 20, the clamp 302 is configured by a clamp which is used in finish processing of the tube end surface 311t into a flat surface that is perpendicular to a tube axis 327.

Aspect 22 of the invention is a method of welding a resin pipe in which a welding apparatus 300 is used, the apparatus having a heating portion 307 externally surrounding a joining portion 330 in which a pipe end portion 304A of a synthetic resin-made welding joint 304 and a tube end portion 311A of a synthetic resin-made tube 311 are fitted together, the apparatus being configured so that the joining portion 330 is heated and melted by heating of the heating portion 307, to enable the pipe end portion 304A and the tube end portion 311A to be welded together, and the pipe end portion 304A and the tube end portion 311A are welded together, wherein a clamp 302 which is surroundingly engageable with the tube 311, and a welding apparatus body 301 which is engageable with the clamp 302 in a state where a relative position in a longitudinal direction of the tube is determined are prepared, the tube 311 is surroundingly engaged by the clamp 302 in a place that is separated by a predetermined distance from a tube end surface 311t of the tube, and the joining portion 330 is heated and melted in a state where the clamp 302 with which the tube 311 is engaged is engaged with the welding apparatus body 301, whereby the pipe end portion 304A and the tube end portion 311A are welded together.

Aspect 23 of the invention is characterized in that, in the method of welding a resin pipe according to aspect 22, a clamp which is used in finish processing of the tube end surface 311t into a flat surface that is perpendicular to a tube axis 327 is used also as the clamp 302.

Effects of the Invention

According to aspect 1 of the invention, although its detail will be described in the paragraph of embodiments, the existence of the expansion gap which is radially outside the holder allows the joining portion and the holder to be expandingly deformed toward the radially outer side by heating of the heating means, so that the pipe end portion and the tube end portion are satisfactorily welded and integrated with each other while maintaining a state where the radii of the internal flow path of the tube and the joint flow path are uniform, i.e., an excellent flow path state. As a result, it is possible to provide a welding joint in which, in a joining portion configured by fitting and insertion of a pipe end portion and a tube end portion, inward expansion and bead formation due to heat welding are suppressed as far as possible or cancelled by further ingenuity of the structure, and which is improved so that welding and integration are satisfactorily enabled without causing a fluid passing resistance. Furthermore, the expansion gap for the purpose is formed in the radial space with respect to the heating means by the flange formed in the holder. Therefore, there are advantages that the cost is low, and that uniform welding can be surely performed.

According to aspect 2 of the invention, the flange is placed in the joint inner side of the holder in the axial direction. Therefore, the flange is axially separated from the joining portion where the pipe end portion and the tube end portion, are fitted to each other. There is an advantage that, although the surrounding by the heating means can be performed without causing eccentricity while aligning the axes, the apparatus can contribute to further uniform welding of the joining portion.

According to aspect 3 of the invention, the radial thickness of the flange is set to 1.4 to 15 times that of the portion of the holder other than the flange. When the thickness is smaller than 1.4 times, it is difficult to ensure the expansion gap for allowing the expanding deformation of the joining portion and the holder due to welding toward the radially outer side, and, when exceeding 15 times, the efficiency of heat transfer to the joining portion is so impaired that satisfactory welding is not performed. In the range of 1.4 to 15 times, therefore, satisfactory welding can be performed.

According to aspect 4 of the invention, the length of the holder in the axial direction is set to 2 to 10 times the length of the flange in the axial direction. When the length is shorter than 2 times, the joining portion tends to be excessively exposed to the heating means, and it is difficult to maintain the circularity after welding. When exceeding 10, the length of the joining portion in the axial direction is unnecessarily increased, and the holder lacks compactness. In the range of 2 to 10 times, therefore, satisfactory welding can be performed.

According to aspect 5 of the invention, the melting temperature of the holder is set to be higher than that of the pipe end portion. Therefore, there is an advantage that, even when the pipe end portion melts in welding, the holder does not melt, and the cylindrical shape is maintained, so that the circularity of the joining portion after welding can be maintained.

According to aspect 6 of the invention, aspect 1 of the invention is configured as a method, and hence it is possible to attain the same effects as those of aspect 1 of the invention. Aspect 7 of the invention is a method version of aspect 2 of the invention, and hence it is possible to attain the same effects as those of aspect 2 of the invention.

According to aspect 8 of the invention, although its detail will be described in the paragraph of embodiments, the heating portion is configured by the pair of half-split heaters each having: the heat transmitting case; and the heating element which is housed in the state where the element is conductively connected to the outside in one end portion of the case in the circumferential direction, and folded back in the other end in the circumferential direction. Therefore, the half-split heaters can be in direct contact with each other, the heating situation can be more uniformalized, so that welding of a stable quality can be performed, and maintenance and inspection of an insulation material are not required, with the result that maintenance-free is realized. Moreover, the conventional configuration where the half-split heaters are conductively connected to each other in the other ends by a junk wire is not necessary. There are also advantages that the structure is simplified, and that a possibility of a disadvantage of catching the junk wire is eliminated. As a result, it is possible to provide a welding apparatus which, although preserving a heating portion configured by a simple structure having a pair of half-split heaters, is improved by further ingenuity so that a stable welding situation due to more uniform heating is realized, an insulation material is made unnecessary, and maintenance free is enabled.

According to aspect 9 of the invention, because of the swing opening and closing structure which uses the shapes of the half-split heaters, although the joining portion is allowed to enter and exit the heating portion in the simple structure, the heating portion is closely fitted onto the joining portion in the closed state, and highly efficient heating can be performed. Therefore, it is possible to provide a welding apparatus which is suitable for a practical use, and which can be used conveniently and easily in spite of the simple structure.

According to aspect 10 of the invention, the opening and closing fulcrum of the heating portion is on the side of the one end portion, i.e., the side which is conductively connected to the outside, and hence conducting means for the half-split heaters, such as wirings or lead wires does not exist on the side where the joining portion enters and exits the heating portion. Therefore, there is an advantage that the both structures of the conducting means and the structure can be simplified. Then, the heating element can be configured by a coil heater as in aspect 11. The insulative heat conductive material of the heat transmitting case is preferably configured by a ceramic as in aspect 12.

According to aspect 13 of the invention, although its detail will be described in the paragraph of embodiments, the recess groove is formed by the end surface due to the thickening of the joint body portion for preventing an early damage from occurring, and the projection which is disposed in the pipe end portion, and hence a structure which is fitted into the recess groove is used as means for supporting the pipe end portion in a welding apparatus, so that displacement in the axial direction of the pipe end portion is not performed. As compared with the case where a structure which has an area of a certain extent, and which grasps the pipe end portion is employed, therefore, the required length (projection length) of the pipe end portion can be shortened. Therefore, also the structure for supporting the pipe end portion in the welding apparatus can be compactified. As a result, it is possible to provide a more improved and rationalized welding joint in which, in a welding joint having a non-linear shape, a configuration where a joint body portion is thickened is effectively used so as to exert the above-described effects (a) and (b), and a pipe end portion and a welding apparatus are enabled to be compactified while maintaining necessary functions.

According to aspect 14 of the invention, the recess groove is formed as a circumferential recess groove. Therefore, conditions such as that, when the joint is to be set in a welding apparatus, fitting is performed after coincident with the place where the recess groove exists are not required, and only a simple attaching operation is required. There is an additional advantage that the operation in welding can be simplified.

As aspects 15 and 16 of the invention, the joint is suitably used as a welding joint which has the T- or L-like shape, and which is often used as a joint having a non-linear shape. When the joint is made of a fluorine resin as in aspect 17, it is possible to provide a welding joint which has excellent heat and chemical resistances, which can be used irrespective of the kind and temperature of a fluid, and which is therefore excellent in versatility.

According to aspect 18 of the invention, although its detail will be described in the paragraph of embodiments, the welding apparatus body is configured so as to be engageable with the clamp in a state where a relative position in the longitudinal direction of the tube is determined. When the tube is preliminarily assembled to the clamp according to the rule, therefore, welding can be performed in the normal insertion state where the tube end surface always abuts against the step side surface. As a result, it is possible to provide an apparatus for welding a resin pipe which is improved so that, when the joining portion is to be melted to weld the pipe end portion and the tube end portion together, a normal insertion state where the tube end surface abuts against a step side surface of a welding joint is attained, and a disadvantage that, because of insufficient insertion of the welding joint and the tube, a gap is formed between the step side surface and the tube end surface does not occur.

According to aspect 19 of the invention, the means for positioning the clamp and the welding apparatus body is configured by distributing the annular ridge and annular recess groove which are fittable to each other, to the clamp and the welding apparatus body. Therefore, the Above-described effects of aspect 18 of the invention can be attained by a simple operation of fitting the annular ridge to the annular recess groove and setting the clamp to the welding apparatus body. In this case, when the annular ridge is disposed in the clamp, and the annular recess groove is disposed in the welding apparatus body as in aspect 20, there is an advantage that the welding apparatus including the clamp can be compactified in length in the axial direction of the tube, as compared with the case where the opposite configuration is employed.

According to aspect 21 of the invention, the clamp which is used in finish processing of the tube end surface into a flat surface that is perpendicular to the tube axis can be used also as the clamp which is to be engaged with the welding apparatus body. Therefore, one dedicated jig can be omitted, and it is possible to provide a more rational apparatus for welding a resin pipe which can contribute to cost reduction and reduction of the maintenance cost.

According to aspect 22 of the invention, it is possible to provide a method of welding a resin pipe which can attain effects which are equivalent to those of the apparatus for welding a resin pipe of aspect 18 of the invention, and, according to aspect 23 of the invention, it is possible to provide a method of welding a resin pipe which can attain effects which are equivalent to those of the apparatus for welding a resin pipe of aspect 21 of the invention.

BRIEF DESCRIPTION OF THE DRAWINGS

FIG. 2 shows a holder, (a) is a sectional view, and (b) is a front view.

FIG. 3 is a sectional view showing another structure of a flange, (a) shows a separate type, (b) shows a type where an inner circumferential end is omitted, and (c) shows a position change in the axial direction.

FIG. 4 is a front view showing a circumferential intermittent structure of the flange, (a) shows a six-division type, and (b) shows a four-division type.

FIG. 5 shows other shape example of the flange section, (a) shows a type where a circumferential groove is formed, (b) shows a chamfered type, (c) shows a triangle, and (d) shows an outer circumference spherical type.

FIG. 8 shows a single half-split heater, (a) is a plan view, (b) is a side view of a tip end side, and (c) is a side view of a basal end side.

FIG. 15 shows a welding joint of Embodiment 4, (a) is a partially cutaway left side view, and (b) is a partially cutaway right side view.

FIG. 19(*a*) is a functional view showing a clamping step, and FIG. 19(*b*) is a functional view showing an external fitting step.

BEST MODE FOR CARRYING OUT THE INVENTION

Hereinafter, embodiments of the welding joint and method of welding it will be described with reference to the drawings (FIGS. 1 to 5).

Embodiment 1

Figure 1:
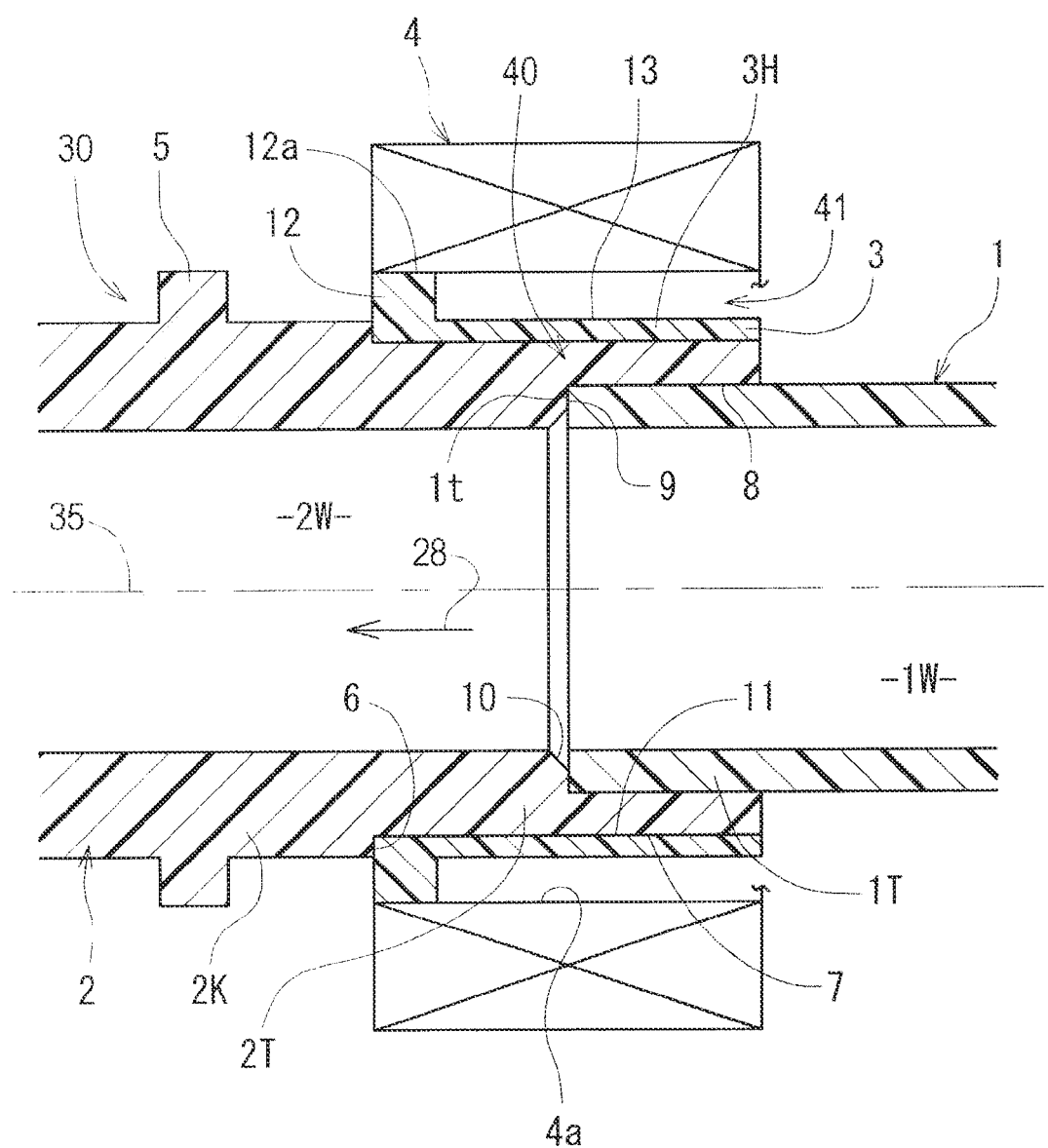
FIG. 1 is a sectional view (Embodiment 1) of main portions showing a welding joint and a joining portion between it and a tube.

As shown in FIG. 1, a welding joint 30 is made of PFA (an example of a thermoplastic synthetic resin) having a joint body 2 including a pipe end portion 2T into which an end portion 1T of a tube 1 made of PFA that is an example of a thermoplastic synthetic resin is to be fitted and inserted, and configured so that the pipe end portion 2T and the end portion 1T which is fitted and inserted thereinto are enabled to be welded together by heating of an annular heater 4 functioning as heating means which externally surrounds the pipe end portion 2T. Then, a holder 3 which is externally fitted and attached to the pipe end portion 2T, and which is made of PTFE (an example of a thermoplastic synthetic resin) is externally fitted and attached, and a flange 12 for ensuring a radial expansion gap 41 with respect to the annular heater 4 is formed in the holder 3.

The outer diameter of the pipe end portion 2T is made slightly smaller than a pipe portion 2K including a flange portion 5, thereby forming a step side circumferential surface 6. The step side circumferential surface 6 is configured so as to function as positioning in the case of fitting insertion of the holder 3 onto the pipe end portion 2T. Namely, the length of the pipe end portion 2T in the direction of the axis 35 which is determined by the step side circumferential surface 6, and that of the holder 3 in the direction of the axis 35 are set to the same value. Preferably, the holder 3 is press inserted to the outer circumferential surface 7 of the pipe end portion 2T. Alternatively, the holder may be externally fitted in the degree at which the holder does not slip off.

About one half of the length of the pipe end portion 2T which extends from its opening in the direction of the axis 35 is formed as an insertion large-diameter inner circumferential surface 8 which is larger in diameter than a joint flow path 2W. The end portion 1T of the tube 1 is press-fit inserted into the insertion large-diameter inner circumferential surface 8, and it is set so that the insertion distance of the end portion 1T is determined by abutting against an inner step surface 9. The interior angle portion of the inner step surface 9 is formed as an inclined surface 10 which is configured by obliquely cutting.

As shown in FIGS. 1 and 2, the holder 3 has a flanged cylindrical shape having an inner circumferential surface 11 which is to be fitted onto the outer circumferential surface 7 of the pipe end portion 2T, and which has a uniform diameter, and an outer circumferential surface 13. A flange (outer circumference flange) 12 for ensuring the radial expansion gap 41 with respect to the inner circumferential surface 4a of the annular heater 4 is integrally formed at the end which is in the innermost side (the side of the arrow 28) in the direction of the axis 35 as the welding joint 30. The radial thickness 43 of the flange 12 is set to 1.4 to 15 times the radial thickness 44 of the portion of the holder 3 other than the flange 12 (i.e., (43)=(1.4~15)×(44)), and the length 45 of the holder 3 in the direction of the axis 35 is set to 2 to 10 times the length 46 of the flange 12 in the direction of the axis 35 (i.e., (45)=(2~10)×(46)).

The PTFE which is the synthetic resin forming the holder 3 has a melting temperature that is higher than that of the PFA which is the synthetic resin forming the pipe end portion 2T, i.e., the joint body 2. Preferably, the synthetic resin forming the holder 3 is a material having a melt viscosity which is higher than the melt viscosities of the synthetic resins forming the tube 1 and the joint body 2.

In the tube 1, the diameter of the inner flow path 1W is set to be equivalent to that of the joint flow path 2W. When the tube is forcedly inserted (or relatively easily inserted), the end portion 1T can be fitted and inserted into the insertion large-diameter inner circumferential surface 8. The insertion of the tube 1 into the joint body 2 is performed by inserting the tube until the tube end surface it abuts against the inner step surface 9.

Next, a method (welding method) of connecting the welding joint 30 and the tube 1 to each other will be de-scribed. First, a process where the holder 3 is externally fitted and inserted, and then held onto the pipe end portion 2T while being preceded by the flange 12, or that where the welding joint 30 in which the holder 3 is press-fitted or closely fitted onto the pipe end portion 2T in a state where the flange 12 exists in the inner deep side is previously prepared is selected and executed. When the holder 3 is to be inserted to the pipe end portion 2T, the inserting operation is performed until the holder 3 abuts against the step side circumferential surface 6.

Next, the end portion 1T of the tube 1 is fitted and inserted into the pipe end portion 2T until the tube end surface 1t abuts against the inner step surface 9, and then the annular heater 4 surrounds in a state where the inner circumferential surface 4a contacts (abuts) with the outer circumferential surface 12a of the flange 12 of the holder 3, and is fitted (the state of FIG. 1). Then, the annular heater is energized to generate heat, whereby the fitted and inserted portion between the pipe end portion 2T and the tube end portion 1T, i.e., the joining portion 40 is heated and welded from the outer circumferential side.

In the method of welding the synthetic resin-made welding joint 30 in which the pipe end portion 2T of the welding joint 30, and the end portion 1T of the synthetic resin-made tube 1 which is fitted and inserted to the pipe end portion 2T are welded together by heating by the annular heater 4 which is placed in a state where the heater externally surrounds the pipe end portion 2T, namely, the synthetic resin-made holder 3 is fitted and attached onto the pipe end portion 2T, and the annular heater 4 is placed and heated in a state where the predetermined radial gap 41 is formed with respect to the outer circumferential surface 13 of the holder 3. Then, the flange 12 which is projected by a predetermined amount to the radially outer side is formed in the holder 3, and the heating is performed in the state where the annular heater 4 is in external contact with the flange 12, thereby enabling the axes of the holder 3 and the annular heater 4 to be easily aligned with each other. Therefore, it is possible to obtain a uniform heating state.

Most of the heat generated by the annular heater 4 is transmitted to the joining portion 40 as radiation heat transmitted through the radial expansion gap (annular space) 41, and part of the heat is directly transmitted through the flange 12. In this case, the holder 3 has important functions of protecting the pipe end portion 2T, and transmitting the heat to the pipe end portion 2T, the heat being generated by the annular heater 4 while uniformizing the heat.

The joining portion 40 is caused to expand by heating, and the expansion is an expansion toward the radial outer side (in summary, expansion of the radial thickness toward the radial outer side) unless restriction is imposed. In this case, although illustration is omitted, the expansion portion is absorbed into the expansion gap 41 which exists in the radially outer side together with the holder 3, and a state where an expansion toward the inner side (radially inner side) does not occur or scarcely occurs is caused. Even when a very small expansion toward the radially inner side occurs, the small expansion can be absorbed by the annular space which is formed by the inclined surface 10 and the tube end surface 1t.

Namely, the PFA-made welding joint which is configured so that the pipe end portion 2T and the end portion 1T of the PFA tube 1 that is fitted and inserted into the pipe end portion can be welded by heating by the annular heater 4 which externally surrounds the pipe end portion 2T is characterized in that the PTFE-made holder 3 which is fitted and attached onto the pipe end portion 2T is disposed, and the flange 12 for ensuring the radial expansion gap 41 with respect to the annular heater 4 is formed in the holder 3. Accordingly, it is successful in providing a welding joint and method of welding it which are improved so that expansion deformation toward the radially outer side by heating is allowed, and the end portions 2T, 1T are satisfactorily welded and integrated with each other while maintaining a state where the radii of the internal flow path 1W and joint flow path 2W which has the same diameter are uniform in diameter, i.e., an excellent flow path state.

In the holder 3, the portion (body portion 3H) other than the flange 12 is thin and easily deflected. During welding, therefore, the welded portion expands into the gap with respect to the annular heater 4, i.e., the expansion gap 41, and the bead expansion toward the welding inner surface (inner surface of the joining portion 40) is suppressed or cancelled. The flange 12 holds the pipe end portion 2T, and hence uneven undulation of the welded portion (joining portion 40) can be suppressed during welding. The flange 12 is caused by the thermal expansion to be in contact or in firm contact with the inner circumferential surface 4a of the annular heater 4. Therefore, the efficiency of heat transfer to the body portion 3H which is not contacted with the annular heater 4 is improved. This can contribute to realization of a uniform welded state.

Next, various other shapes of the holder 3 will be described. First, the holder 3 shown in FIG. 3(a) is configured by two components, and configured by fitting and integrating an annular large-diameter flange 14 with a cylindrical holder body 3A. The whole shape is identical with that of the integral type holder 3 shown in FIG. 2. The large-diameter flange 14 corresponds to the flange 12. Press insertion, fitting, adhesion, or the like may be employed as integrating means.

The holder 3 shown in FIG. 3(b) has a shape in which, in the holder 3 shown in FIG. 2, an inner circumferential end on the side of the flange 12 is cut away. Namely, the holder 3 has a structure where an annular gap 49 is disposed in which about one half of the length of an inner end portion of the thin body portion 3H is omitted by about one half of the width of the flange 12 extending from its end in the direction of the axis 35. In this case, the flange 12 is formed integrally with the body portion 3H.

The holder 3 shown in FIG. 3(c) has a structure in which the position of the flange 12 is set to a middle of the body portion 3H in the direction of the axis 35. The position is set to a position which is slightly shifted to the inner deep side.

FIG. 4(a) shows the holder 3 having the flange 12 which exists intermittently in the circumferential direction. In the holder, small gaps 15 are formed between adjacent six-division flange sections 12s (adjacent in the circumferential direction). In each of the six-division flange sections 12s, an arcuate outer circumferential surface 16 which is centered at the axis 35 is formed so as to be in internal contact with the inner circumference of the annular heater 4.

FIG. 4(b) shows the holder 3 No. 2 having the flange 12 which exists intermittently in the circumferential direction. In the holder, large gaps 17 are formed between adjacent four-division flange sections 12f (adjacent in the circumferential direction). In each of the four-division flange sections 12f, an arcuate outer circumferential surface 18 which is centered at the axis 35 is formed so as to be in internal contact with the inner circumference of the annular heater 4.

The holder 3 shown in FIG. 5(a) has a structure in which an outer circumferential groove 19 is formed in the flange 12 of the holder 3 shown in FIG. 2. The illustrated outer circumferential groove 19 is an annular groove which is continuous in the circumferential direction. Alternatively, the groove may be intermittently formed in the circumferential direction.

The holder 3 shown in FIG. 5(b) has a structure in which inclined cut surfaces 20, 20 are disposed by, for example, chamfering the both edges of the flange 12 of the holder 3 shown in FIG. 2 in the direction of the axis 35.

The holder 3 shown in FIG. 5(c) is configured as if a section of the flange 12 exhibits a triangular shape, by forming the outer side (on the side of the tube 1 in the direction of the axis 35) of the flange 12 of the holder 3 shown in FIG. 2 as an inclined surface 21, and making the width of the outer circumferential surface 12a very small.

The holder 3 shown in FIG. 5(d) has a structure in which the both edges of the flange 12 of the holder 3 shown in FIG. 2 in the direction of the axis 35 are spherical-surface processed or rounded, and the holder has an outer circumferential surface 22 having a semicircular section.

Other Embodiments

The position of the flange 12 may be on the side of the tube (the outer front side) in the holder 3. Alternatively, a structure where a pair of flanges are disposed respectively in the both ends of the holder 3 in the direction of the axis 35 may be employed. Any synthetic resin which is caused to melt by heating may be used. Of course, a synthetic resin other than PFA and PTFE may be used.

Figure 6:
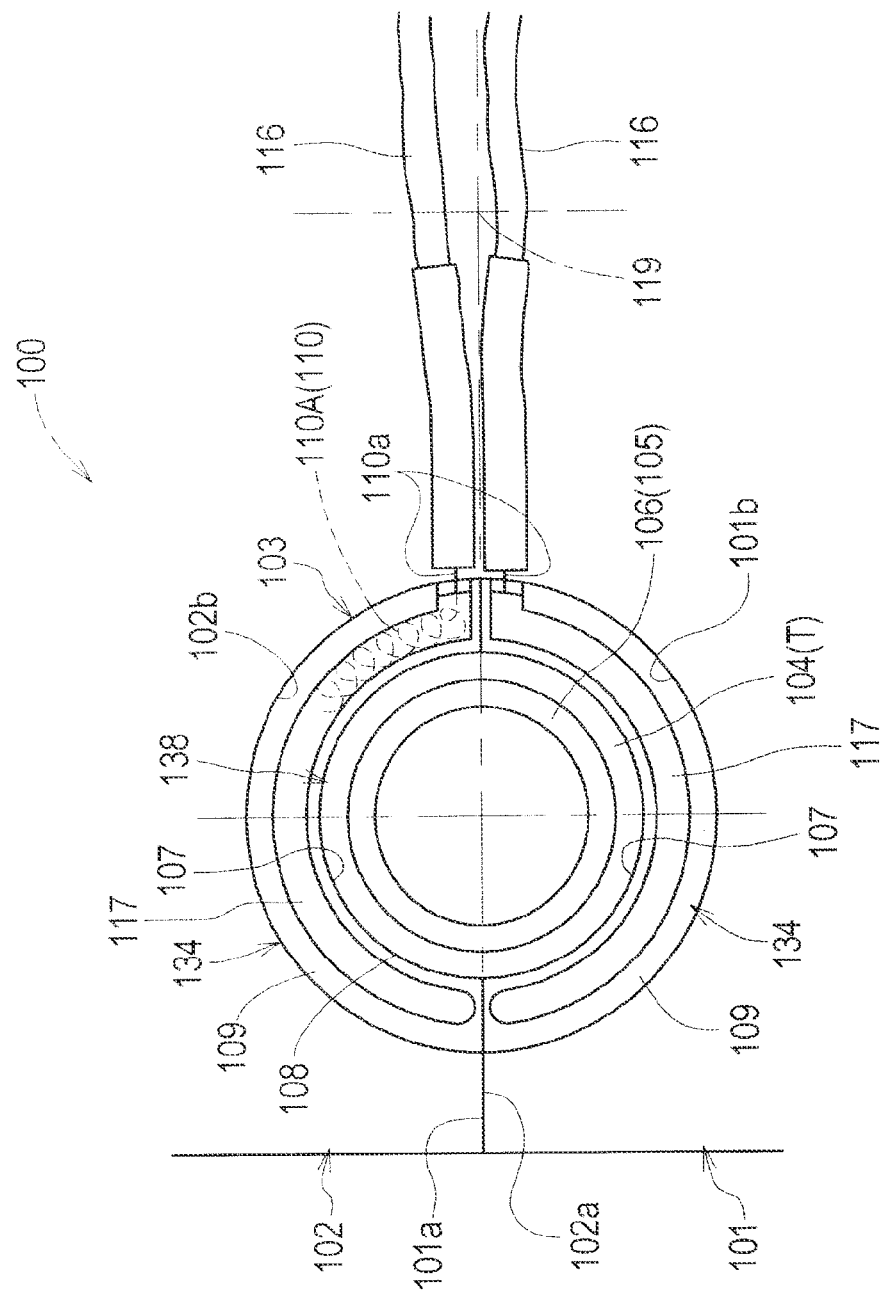
FIG. 6 is a front view (Embodiment 2) showing main portions of a welding apparatus in a closed state.
Figure 7:
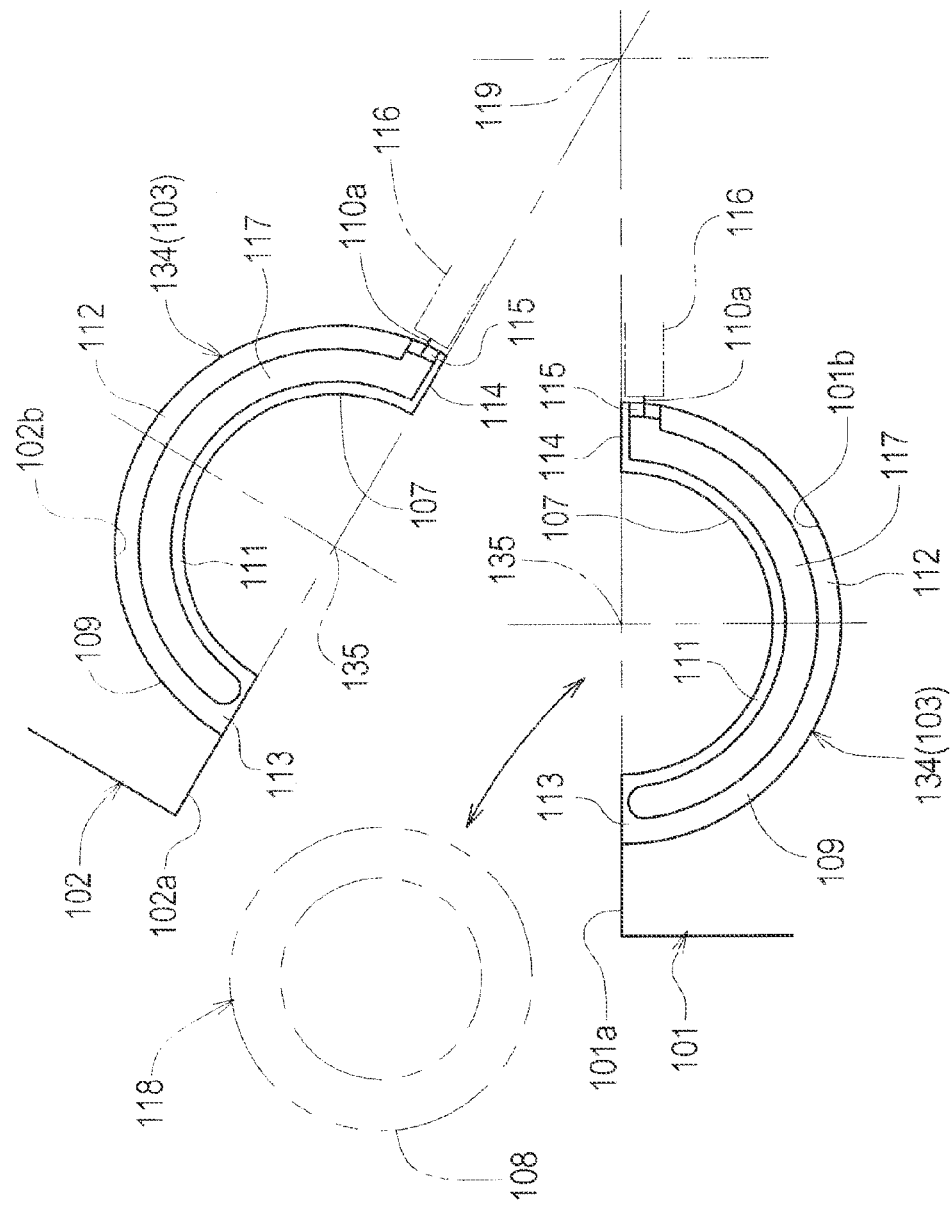
FIG. 7 is a front view of main portions showing an opened state of the welding apparatus.
Figure 9:
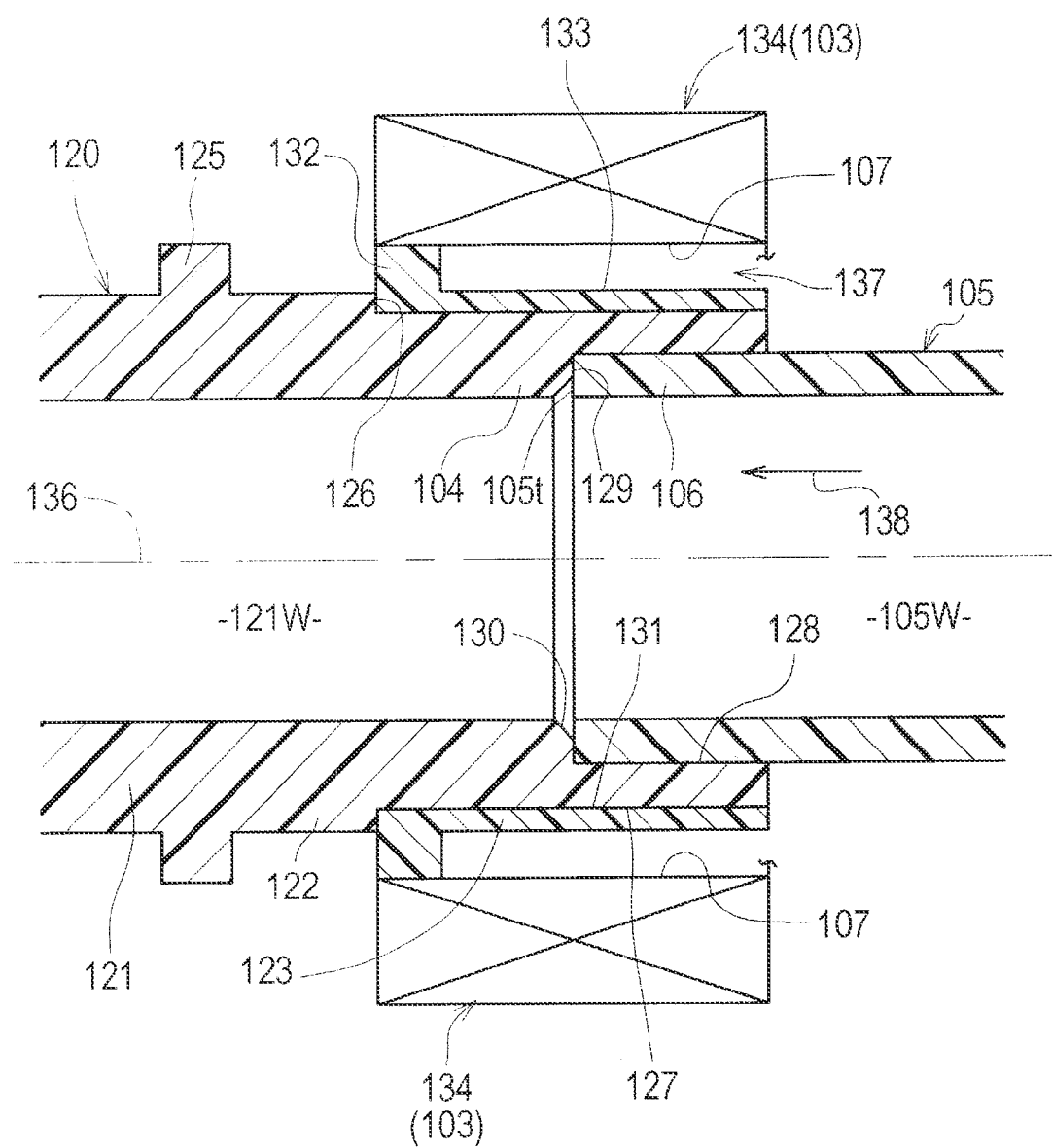
FIG. 9 is a sectional view of main portions showing an example of a welding work by the welding apparatus.
Figure 10:
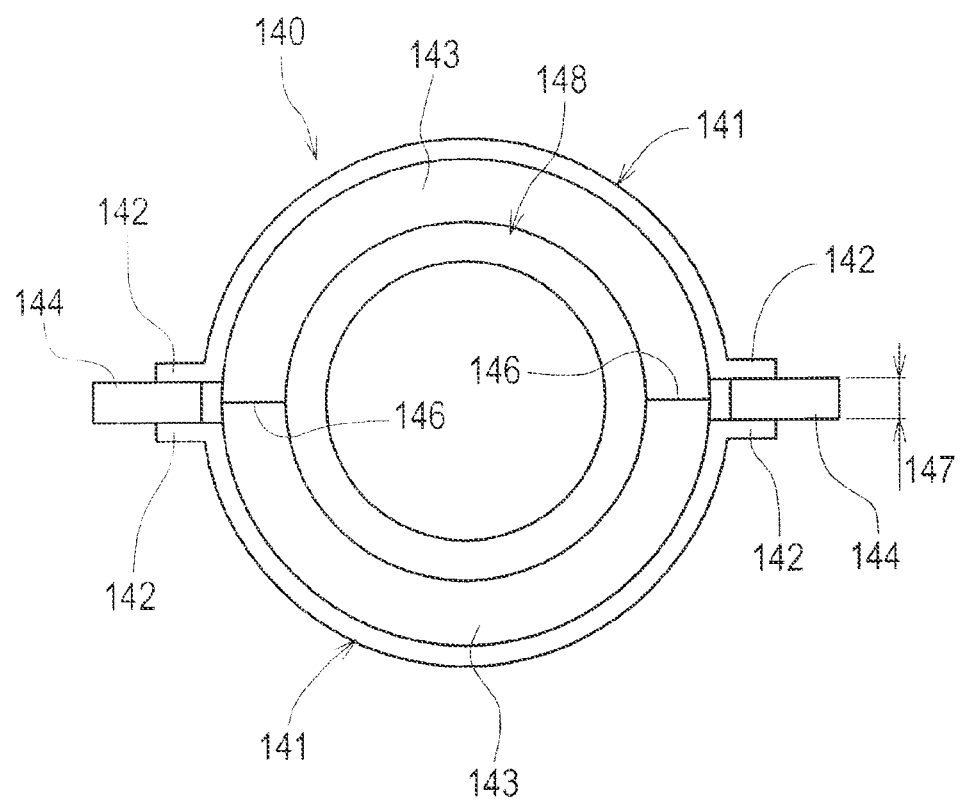
FIG. 10 is a front view of the closed state showing main portions of a conventional welding apparatus.

Hereinafter, an embodiment of the welding apparatus will be described with reference to drawings (FIGS. 6 to 10). FIGS. 6 to 8 show the welding apparatus, FIG. 9 is a sectional view showing a state of a welding example, and FIG. 10 is a sectional view showing main portions of a conventional welding apparatus.

Embodiment 2

As shown in FIGS. 6 and 7, the welding apparatus 100 is configured to have: a cradle 101 which is in the lower side; an opening and closing member 102 which is pivotally coupled with the cradle 101 so as to be vertically swingable about a horizontal opening and closing axis 119; and a heating portion 103 which is a straddle formed on both the cradle 101 and the opening and closing member 102. The heating portion 103 is configured as a so-called annular heater consisting of a lower half-split heater 134 which is supported by the cradle 101, and an upper half-split heater 134 which is supported by the opening and closing member 102. The pair of upper and lower half-split heaters 134 have a common axis 135.

FIG. 6 shows a closed state where the lower surface 102a of the opening and closing member 102 abuts against the upper surface 1a of the cradle 101, and a welding operation is enabled. In the closed state, a closed state is shown where the heating portion 103 externally surrounds a joining portion 118 in which a pipe end portion 104 of a welding joint 120 made of a synthetic resin (PFA) and an end portion 106 of a tube 105 made of a synthetic resin (PFA or the like) are fitted together, and the pipe end portion 104 and the end portion 106 can be welded together by heating and welding the joining portion 118 by heating of the heating portion 103.

In the closed state, the inner circumferential surfaces 107 of the half-split heaters 134 are closely fitted onto the outer circumferential surface 108 of the joining portion 118, and the joining portion 118 can be heated and welded by heating by means of energization using lead wires (not shown) to the half-split heaters 134.

FIG. 7 shows an opened state where the opening and closing member 102 is upward swung about the axis 135 with respect to the cradle 101. In the opened state, the upper surface 101a of the cradle 101 and the lower surface 102a of the opening and closing member 102 are largely separated from each other, and the joining portion 118 is enabled to be attached to and detached from the inner circumferential surfaces 107 of the half-split heaters 134. Namely, in the state, the joining portion 118 which has not been welded can be set to be attached to the inner circumferential surfaces 107 of the cradle 101, and the joining portion 118 after welding can be detached and removed from the cradle 101. The lower half-split heater 134 is fitted and supported by an inner circumferential portion 101b of the cradle 101, and the upper half-split heater 134 is fitted and supported by an inner circumferential portion 102b of the opening and closing member 102.

Next, the heating portion 103 and the like will be described. The heating portion 103 is configured by an annular member (see FIG. 6) which is used for heating a joining portion, and in which the pair of half-split heaters 134 each having the semicircular inner circumferential surface 107 are placed in the circumferential direction. As shown in FIGS. 6 to 9, each of the half-split heaters 134 is configured to have: a heat transmitting case 109 which is made of a ceramic (an example of an insulative heat conductive material), and which exhibits a substantially semicircular shape; and a coil heater (an example of a heating element) 110 which is housed in the heat transmitting case 109 in a state where the heater is taken out in one end portion of the heat transmitting case 109 in the circumferential direction, and folded back in another end in the circumferential direction. The half-split heater 134 equipped on the cradle 101 and the half-split heater 134 equipped on the opening and closing member 102 are identical with each other.

The heat transmitting case 109 is a substantially semi-cylindrical component which has an inner circumferential wall 111 having the inner circumferential surfaces 107, an outer circumferential wall 112, a tip end wall 113, a basal end wall 114, and a pair of outer circumferential cutaway portions 115, 115. In the outer circumferential wall 112, an outer circumferential groove 112a is formed in the middle of the width direction, and the cutaway portions 115, 115 which are in a state where they are recessed from the outer side in the width direction toward the inner side in order to take out the end portions of the coil heater 110 to the outside are formed in the end on the side of the basal end wall 114. The coil heater 110 has: draw-out end portions 110a which are to be drawn out to the outside through the cutaways 115; a heating body portion 110A which is housed in the heat transmitting case 109 in a state where it is wound in a coil-like manner and folded back on the side of the tip end wall 113; a heat shielding cover 116 which is outside the heat transmitting case; and the like. The heating body portion 110A which is housed inside the heat transmitting case 109 is disposed in the heat transmitting case 109 in a position fixed state where it is internally attached by an insulating agent 117 injected therearound, without being displaced.

When the welding apparatus 100 is set to the closed state, the tip end walls 113 and basal end walls 114 of the upper and lower half-split heaters 134, 134 abut against each other as shown in FIG. 6, and a gap 147 (see FIG. 10) does not exist unlike the conventional art. In the half-split heater 134, a process of insulation from the outside has been already conducted by the heat transmitting case 109, and it is realized to cause the half-split heaters 134 to abut against each other while the conventional insulation material 144 (see FIG. 10) formed by a mica plate or the like can be omitted. Therefore, welding in which the heating situation is more uniformalized, and the quality is stabilized as compared with the conventional art can be performed, and maintenance and inspection of an insulation material are not required, with the result that also maintenance-free is realized.

The half-split heater 134 is configured by the heat transmitting case 109 which is made of an insulative heat conductive material, and the heating element 110 which is conductively connected to the outside in one end portion of the case in the circumferential direction, and which is housed in the state where the element is folded back in the other end in the circumferential direction. Therefore, anode and cathode lead wires are collectively placed in the one end side. Unlike the conventional art (Patent Literature 3), a junk wire through which half-split heaters are conductively connected to each other in the other end side is not required. There are advantages that the structure is simplified, and that a possibility of a disadvantage of catching the junk wire is eliminated. Preferably, a ceramic which is excellent in both insulation property and heat conductivity is used as the insulative heat conductive material, and a coil heater which is economical and readily purchased, and which can be easily bent is used as the heating element 110.

Use Example

Next, one use example in the case where the welding joint 120 and the tube 105 are welded to each other by using the welding apparatus 100 will be described. As shown in FIG. 9, the welding joint is made of PFA and has a joint body 121 including the pipe end portion 104 into which the end portion 106 of the tube 105 made of PFA that is an example of a thermoplastic synthetic resin is to be fitted and inserted, and configured so that, as heating means which externally surrounds the pipe end portion 104, the pipe end portion 104 and the tube end portion 106 which is fitted and inserted thereinto can be welded to each other by heating by a heating portion 103 functioning as an annular heater. A PTFE-made holder 123 which is to be fitted and attached onto the pipe end portion 104 is fitted and attached, and a flange 132 for ensuring a radial expansion gap 137 with respect to the heating portion 103 is formed in the holder 123.

The outer diameter of the pipe end portion 104 is made slightly smaller than a pipe portion 122 including a flange portion 125, thereby forming a step side circumferential surface 126. The step side circumferential surface 126 is configured so as to function as positioning in the case of fitting and insertion of the holder 123 onto the pipe end portion 104. Namely, the length of the pipe end portion 104 in the direction of the axis 136 which is determined by the step side circumferential surface 126, and that of the holder 123 in the direction of the axis 136 are set to the same value. Preferably, the holder 123 is press inserted to the outer circumferential surface 127 of the pipe end portion 104. Alternatively, the holder may be externally fitted in the degree at which the holder does not slip off.

About one half of the length of the pipe end portion 104 which extends from its opening in the direction of the axis 136 is formed as an insertion large-diameter inner circumferential surface 128 which is larger in diameter than a joint flow path 121W. The end portion 106 of the tube 105 is press-fit inserted into the insertion large-diameter inner circumferential surface 128, and it is set so that the insertion amount of the end portion 106 is determined by abutting against an inner step surface 129. The interior angle portion of the inner step surface 129 is formed as an inclined surface 130 which is configured by obliquely cutting.

The holder 123 has a flanged cylindrical shape having an inner circumferential surface 131 which is to be fitted onto the outer circumferential surface 127 of the pipe end portion 104, and which has a uniform diameter, and an outer circumferential surface 133. A flange (outer circumference flange) 132 for ensuring the radial expansion gap 137 with respect to the inner circumferential surface 107 of the heating portion 103, i.e., the half-split heater 134 is integrally formed at the end which is in the innermost side (the side of the arrow 138) in the direction of the axis 136 as the welding joint 120. The PTFE which is the synthetic resin forming the holder 123 has a melting temperature that is higher than that of the PFA which is the synthetic resin forming the pipe end portion 104, i.e., the joint body 121. Preferably, the synthetic resin forming the holder 123 is a material having a melt viscosity which is higher than the melt viscosities of the synthetic resins forming the tube 105 and the joint body 121.

In the tube 105, the diameter of the inner flow path 105W is set to be equivalent to that of the joint flow path 121W. When the tube is forcedly inserted (or relatively easily inserted), the end portion 106 can be fitted and inserted into the insertion large-diameter inner circumferential surface 128. The insertion of the tube 105 into the joint body 121 is performed by inserting the tube until the tube end surface 105t abuts against the inner step surface 129.

Another Embodiment

The welding apparatus 100 is an apparatus for welding the welding joint 120 with the tube 105, but can weld synthetic resin-made tubes together or synthetic resin-made welding joints together.

Hereinafter, an embodiment of the welding joint will be described with reference to drawings (FIGS. 11 to 15). A welding joint 200 and a tube 213 are made of PFA which is a thermoplastic synthetic resin, and a holder 231 is made of PTFE which is a thermoplastic synthetic resin.

Embodiment 3

Figure 11:
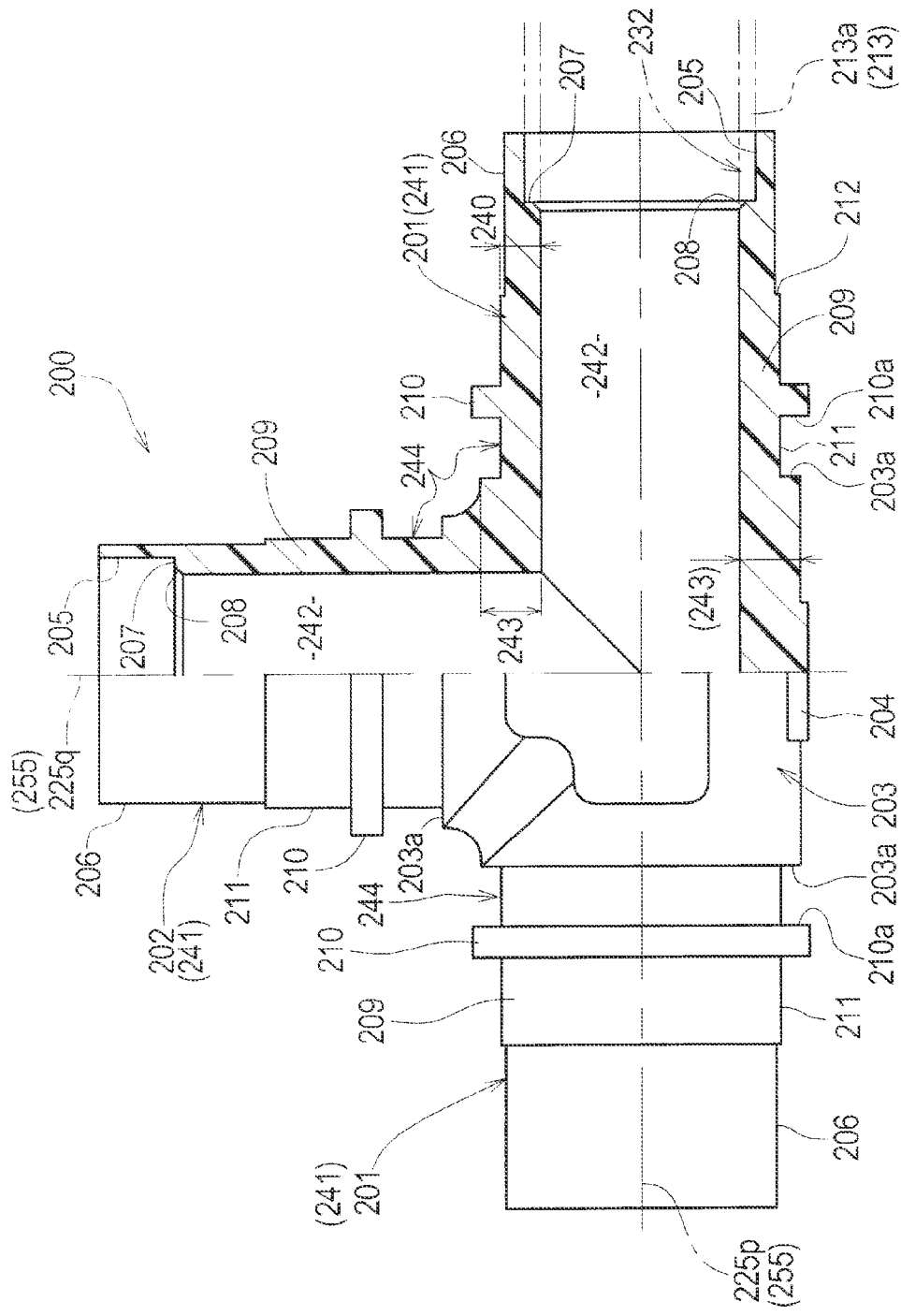
FIG. 11 is a partially cutaway front view showing a welding joint of Embodiment 3.

As shown in FIG. 11, the welding joint 200 of Embodiment 3 has: a main pipe end portion 201(241) having an axis 225p(255); a main pipe end portion (an example of a second pipe end portion) 201(241) which has the same structure as the main pipe end portion 201(241), which has the same axis 225p(255), and which is oppositely directed in the direction of the axis 225p(255); a single branch pipe end portion (an example of a third pipe end portion) 202(241) which has an axis 225q(255) that is perpendicular (an example of intersecting) to the axis 225p; and a joint body portion 203 which functions as basal end portions for the three pipe end portions 201, 201, 202, respectively, is made of PFA (an example of a synthetic resin), and exhibits a T-like shape. The pipe end portions 201, 201, 202 which are portions that are outside step side circumferential surfaces 3a of the joint body portion 203 are portions having the same configuration. The thickness of the joint body portion 203 is larger than that of the pipe end portions 201, 201, 202 so that early damage along a sprue gate (a supply port for the molten resin in die molding) portion 204 or a parting line (not shown) does not occur.

The structure of the pipe end portions 201, 201, 202 will be described by way of the main pipe end portion 201. The pipe end portion is a cylindrical portion including: an end portion body cylinder 209 which is continuous to the step side circumferential surface 203a; an outer circumference flange (an example of a projection and an annular ridge) 210 which is in a state where it upstands from the end portion body cylinder 209; an external fit outer circumferential surface 206 which has an outer diameter that is slightly smaller than that of the end portion body cylinder 209, and which is used for externally fitting of the holder; an insertion large-diameter inner circumferential surface 205 for insertion of the tube; an inner step surface 207 which defines the depth of the insertion large-diameter inner circumferential surface 205 in the direction of the axis 225p; an inclined inner circumferential surface 208 which is continuous to the inner step surface 207; and a joint flow path 242. Since the diameter of the external fit outer circumferential surface 206 is slightly smaller than that of the outer circumferential surface 211 of the end portion body cylinder 209, a small side circumferential surface 212 which is a surface defining an insertion position of the holder 231 that will be described later is formed.

The joint body portion 203 is a T-like (an example of a non-linear shape) component which is continuous to the basal end portions of the pipe end portions 201, 201, 202, and which has a thickness 243 that is larger than their thickness 240, and the step side circumferential surface 203a which is an annular step is formed in the boundaries with the pipe end portions 201, 201, 202. Namely, a thickness difference which causes the thickness 243 of the joint body portion 203 to be larger than the thickness 240 of the pipe end portion 241 is disposed, and an annular end surface 203a due to the thickness difference is formed in the boundary of the joint body portion 203 with the pipe end portion 241. Also the joint flow paths 242, 242 of the main pipe end portions 201, 201, and the joint flow path 242 of the branch pipe end portion 202 exhibit a T-like flow path as a whole. The sprue gate portion 204 is formed in a wall part of the joint body portion 203 which is opposite to the branch pipe end portion 202 in the direction of the axis 225q. In this case, a parting line (not shown) is easily formed in the vicinity of the boundary of the joint body portion 203 with the branch pipe end portion 202.

Here, the thickness 240 may be 1.5 or more times the tube thickness, and the large thickness 243 is set to be 2 or more times the tube thickness. In the welded portion of the tube 213 and the joint body portion 203, there is a possibility that insufficient welding may occur in the joining portion between the inner step surface 207 and the inclined inner circumferential surface 208 which is positioned separately from an annular heater 214. In the case where the thickness 240 is smaller than 1.5 times the tube thickness, there is a possibility that the welding strength between the tube 213 and the joint body portion 203 after welding may be lower than ~½ of the tensile strength of the tube, and, when pulsation of a fluid apparatus is applied, an practical problem remains in the security of the welded portion. When the security of the welded portion is considered, the thickness 240 is required to be at least 1.5 or more times the tube thickness. Preferably, the thickness 240 is set to be 2 or more times the tube thickness, so that the tensile strength of the welded portion is ensured to be equal to or higher than that of the tube.

An outer circumferential flange 210 which is set to be equal to or smaller than the large thickness 243 exists in a place which is slightly separated from the end surface 203a in the direction of the axis 225p. A circumferential groove (an example of a recess groove and a circumferential recess groove) 244 is formed in which the inner circumferential surface 210a of the outer circumferential flange 210 is one side surface, the outer circumferential surface 211 (the outer circumferential surface of the pipe end portion 241) of the end portion body cylinder 209 is the bottom surface, and the end surface 203a is the other side surface. Namely, the circumferential groove 244 which is configured by the outer circumferential flange 210 disposed in the basal end side of each of the pipe end portions 241, and the end surface 203a is formed.

Figure 12:
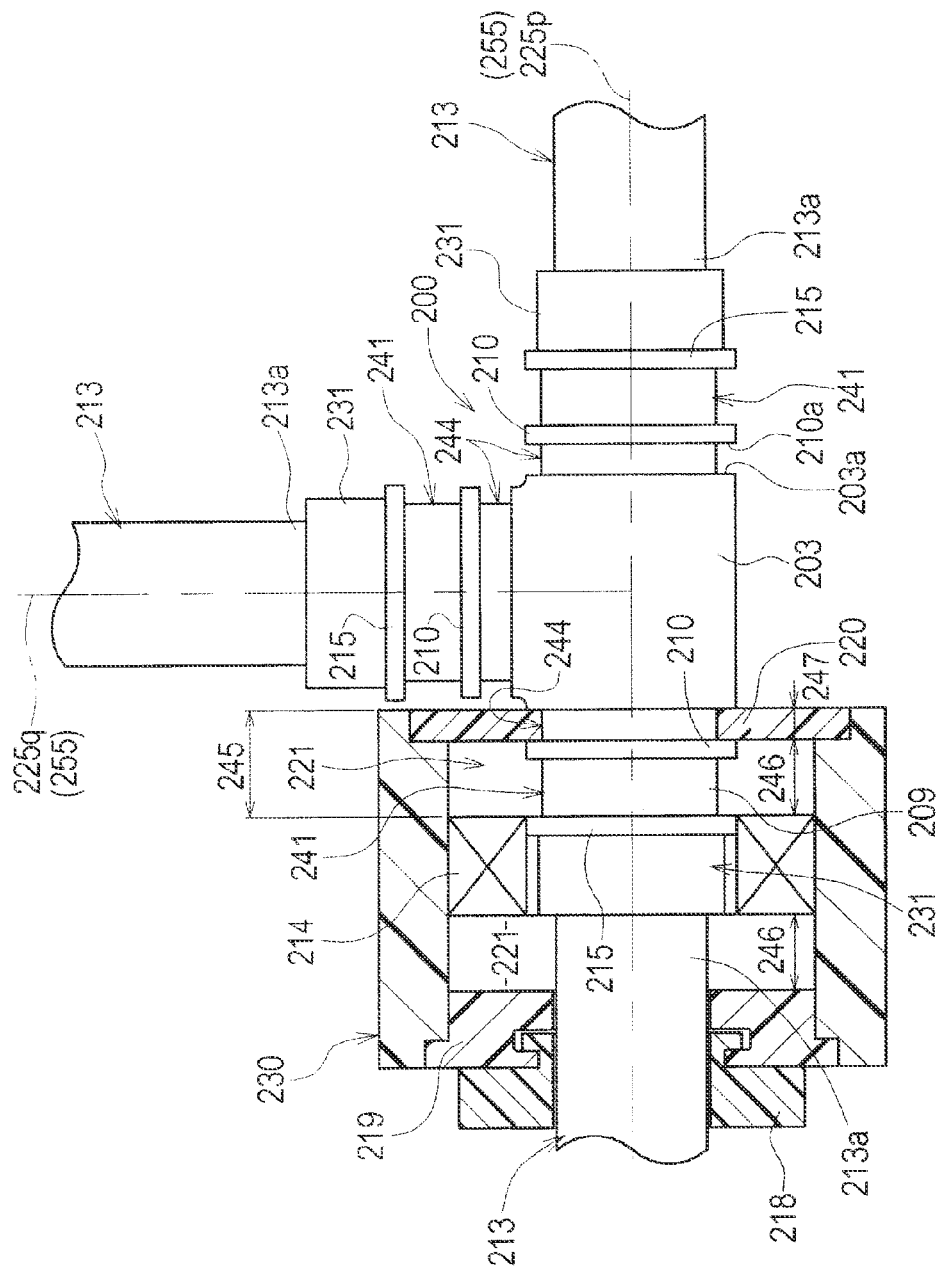
FIG. 12 is a view showing a state of a welding work of the welding joint of FIG. 11 and a tube by a welding apparatus.
Figure 13:
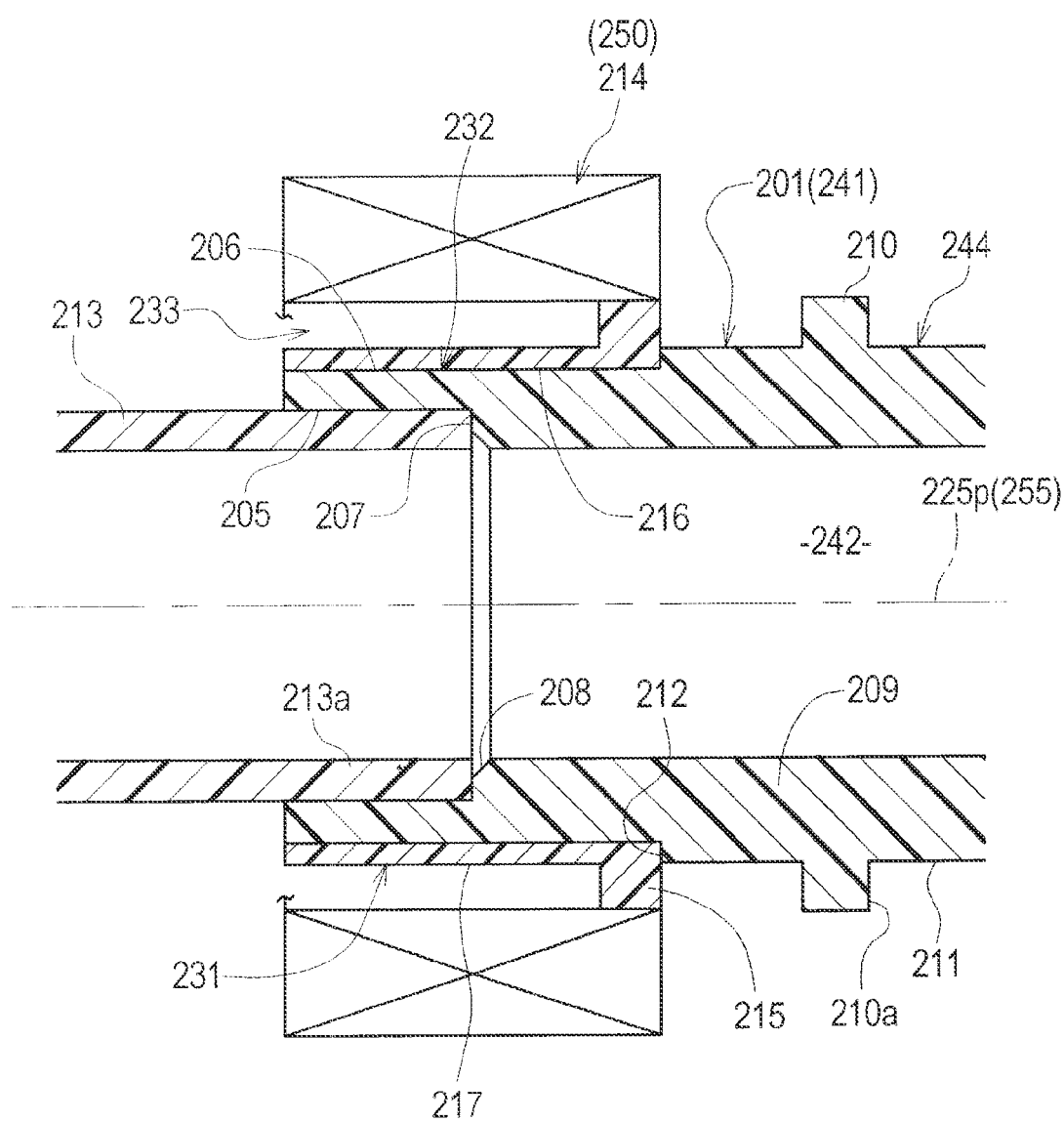
FIG. 13 is a sectional view of main portions showing a joining portion of the welding joint and the tube.

As shown in FIGS. 12 and 13, the welding joint 200 is used for welding and integrating the tube 213 which is fitted into the insertion large-diameter inner circumferential surface 205. A welding apparatus 230 has the annular heater (an example of heating means) 214 which surrounds the holder 231 that is fitted and attached onto the external fit outer circumferential surface 206. When described in detail, the holder 231 is fitted and attached onto the external fit outer circumferential surface 206, the tube end portion 213T is fitted and inserted to the insertion large-diameter inner circumferential surface 205, and a tip end portion of the pipe end portion 201 and the tube end portion 213T are welded together by heating due to heat generation of the annular heater 214 which surrounds the holder 231. A flange 215 for ensuring the radial expansion gap 233 with respect to the annular heater 214 is formed in the basal end side of the holder 231.

Because of the small side circumferential surface 212 functioning as positioning in the case of fitting insertion of the holder 231 onto the external fit outer circumferential surface 206, the length of the external fit outer circumferential surface 206 in the direction of the axis 225p, and that of the holder 231 in the direction of the axis 225p are set to the same value. Preferably, the holder 231 is press inserted to the external fit outer circumferential surface 206. Alternatively, the holder may be externally fitted in the degree at which the holder does not slip off. The length in the direction of the axis 225p of the insertion large-diameter inner circumferential surface 205 which is larger in diameter than the joint flow path 242 is set to about one half of that of the external fit outer circumferential surface 206 in the direction of the axis 225p, and set so that the insertion amount of the tube end portion 213T is determined by abutting against the inner step surface 207. The interior angle portion of the inner step surface 207 is formed as the inclined inner circumferential surface 208 which is configured by obliquely cutting.

As shown in FIGS. 12 and 13, the holder 231 has a flanged cylindrical shape having an inner circumferential surface 216 which is to be fitted onto the outer circumferential surface 206, and which has a uniform diameter, and an outer circumferential surface 217. The above-described flange 215 is at the end which is closest to the joint body portion 203 in the direction of the axis 225p. The thickness of the flange 215 is set to 1.4 to 15 times that of the portion of the holder 231 other than the flange, and the length of the holder 231 in the direction of the axis 225p is set to 2 to 10 times that of the flange 215. The PTFE forming the holder 231 has a melting temperature that is higher than that of the PFA forming the main pipe end portion 201, i.e., the welding joint 200. Preferably, the synthetic resin forming the holder 231 is a material having a melt viscosity which is higher than the melt viscosities of the synthetic resins forming the tube 213 and the welding joint 200.

As shown in FIG. 12, the welding apparatus 230 is configured to have: the annular heater 214 which externally surrounds the holder 231; a first sidewall 219 to which an engagement clamp 218 grasping the tube 213 can be positionally concave/convex fitted; a second sidewall 220 which can be fitted to the circumferential groove 244 of the welding joint 200 to be positionally attached; and the like. The first sidewall 219 and the second sidewall 220 are configured by a heat insulating material configured by a glass cloth-based inorganic resin plate in which a glass cloth base material is fixed by a resin. The annular heater 214 has the same lateral width as the holder 231, and is separated from the sidewalls 219, 220 by disposing a space portion 221 having a length 246 in order to relax the heat effect. The width (thickness) of the second sidewall 220 which is fitted into the circumferential groove 244 and relatively positioned with respect to the welding joint 200 in the direction of the axis 225p can be formed to be sufficiently small as compared with the width (thickness) of the first sidewall 219.

Namely, when the welding of the welding joint 200 and the tube 213 by the welding apparatus 230 is to be performed, the tube 213 is supported by the first sidewall 219 through the engagement clamp 218 in a state where the tube end portion 213a is inserted into the insertion large-diameter inner circumferential surface 205 of the main pipe end portion 201 onto which the holder 231 is fitted, and the welding joint 200 is supported by the second sidewall 220 by using the circumferential groove 244. Then, the annular heater 214 is energized to generate heat, whereby the joining portion 232 between the main pipe end portion 201 and the tube end portion 213a is heated and welded to be integrated. In the welding apparatus 230, the length extending from the annular heater 214 to the outer surface of the second sidewall 220, i.e., the projection length 245 of the main pipe end portion 201 is equal to a length (245=246+247) which is obtained by adding the lateral width 247 of the circumferential groove 244 to the width 246 of the space portion 221. The width 247 is equal also to the width of the second sidewall 220.

Figure 14:
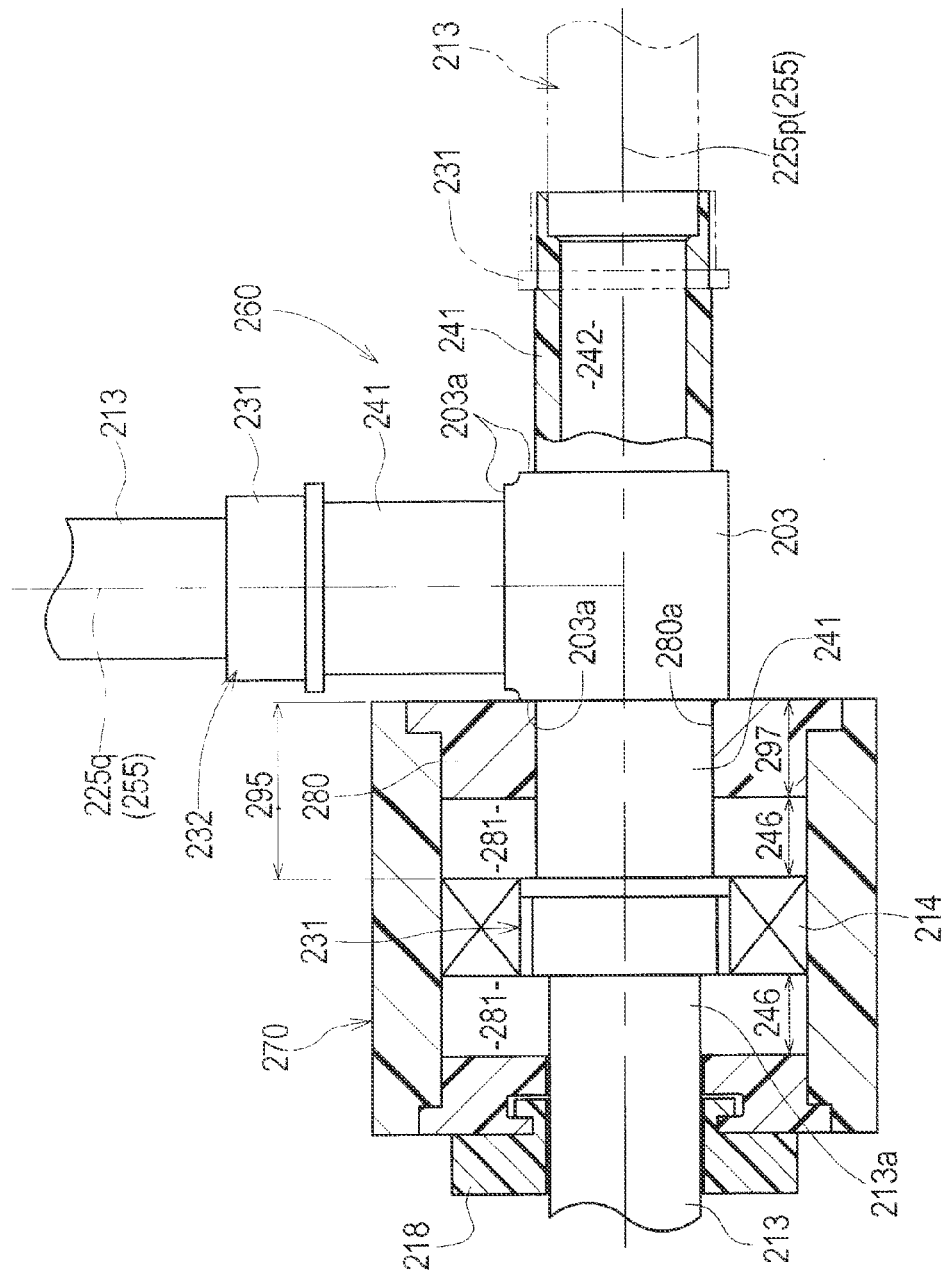
FIG. 14 is a view showing a state of a welding work using a welding joint of a comparative example.

By contrast, in the case of the comparative example shown in FIG. 14, the width 246 of a space portion 281 extending from the annular heater 214 is equal to that shown in FIG. 12, but the width (thickness) 297 of a second sidewall 230 is apparently larger (297>247) than the width 247 of the second sidewall 220 shown in FIG. 12. Therefore, the projection length 295 (=246+297) in the comparative example is clearly larger than the projection length 245 in Embodiment 1 shown in FIG. 12 (245<295). In the case of the comparative example shown in FIG. 14, because of the structure where the main pipe end portion 201 is sandwiched by the second sidewall 230 to be supported and immobilized in the direction of the axis 225p by friction, a width of a certain degree in the direction of the axis 225p is required in order to attain firm and frictional grasp. In the structure of Embodiment 3 where the second sidewall 220 is fitted into the circumferential groove 244 to physically inhibit movement in the direction of the axis 225p, however, the width of the second sidewall 220 can be largely reduced as compared to the second sidewall 230 in the comparative example shown in FIG. 14.

Namely, the welding joint 200 of Embodiment 3 is characterized in that, by using the structure where the thickness of the joint body portion 203 is made larger than the thickness of the pipe end portions 201, 201, 202 in order to prevent an early damage such as crack or break from occurring in the sprue gate portion 204 or the parting line in the vicinity thereof, the circumferential groove 244 is formed by the step side circumferential surface 203a which is an end surface due to the structure, and the outer circumference flange 210 which is newly disposed in the main pipe end portion 201. According to the configuration, it is succeeded to attain a multiple effect that the possibility that an early damage may occur in the sprue gate portion 204 or the parting line can be avoided while the projection length 245 of the pipe end portions 201, 201, 202 can be reduced and the welding joint 200 and the welding apparatus 230 can be compactified.

Moreover, the outer circumference flange 210 is in contact with the heat insulating material configured by a glass cloth-based inorganic resin plate, and the portions other than this face to the space portion (atmosphere) 221. Considering the thermal conductivities of the heat insulating material, the atmosphere, and PFA, "thermal conductivity of heat insulating material<thermal conductivity of atmosphere<thermal conductivity of PFA" is obtained. In the case where infrared rays (heat rays) emitted from the annular heater 214 are absorbed by PFA (the welding joint 200 and the tube 213), therefore, heat is hardly radiated to the outside of the PFA, i.e., the outside of the joint body portion 203. In the case where the thickness of the outer circumference flange 210 is larger than the large thickness 243, therefore, the heat of the annular heater 214 is easily absorbed, and there is a possibility that the absorbed heat may be moved to the main pipe end portion 201(241) of the joint to cause abnormal deformation of the main pipe end portion 201(241). Consequently, it is preferred that the thickness of the outer circumference flange 210 is thin (small) in the degree at which positioning of the second sidewall 220 of the annular heater 214 is enabled. When the certainty of positioning is considered, it is preferred to set the thickness to be at best similar to the large thickness 243.

Embodiment 4

As shown in FIGS. 15(a) and (b), a welding joint 250 of Embodiment 4 has an L-like shape where a second pipe end portion 222(241) which has the same structure as the main pipe end portion 201(241), and which has an axis 225q(255) that is perpendicular (an example of intersecting) to the axis 225p(255) is connected to the joint body portion 203. The L-like welding joint 250 which is also called an elbow pipe has a pipe end portion 201(241) which is identical with the main pipe end portion 201(241) of the T-like welding joint 250 of Embodiment 3, and a second pipe end portion 222(241) which is identical with the branch pipe end portion 202(241) of the T-like welding joint 250 of Embodiment 3. The same components are denoted by the identical reference numerals, and it is assumed that their description has been performed.

Another Embodiment

The recess groove 244 into which the second sidewall 220 is to be fitted may be an intermittent circumferential groove (arcuate recess groove) in which four or six arcuate projections 210 are intermittently arranged in the circumferential direction. The projections 210 may have a shape other than a circular shape, such as a regular octagon. In a configuration where the second sidewall 220 of the welding apparatus 230 has a U-like sectional shape which is fitted while straddling the projection 210, a structure where the width of the recess groove 244 shown in FIG. 11 and the like is further narrowed may be employed. According to the configuration, the pipe end portion 241 can be further shortened in the direction of the axis 225p.

Hereinafter, an embodiment of the resin pipe welding apparatus and method will be described with reference to the drawings (FIGS. 16 to 21).

Embodiment 5

Figure 16:
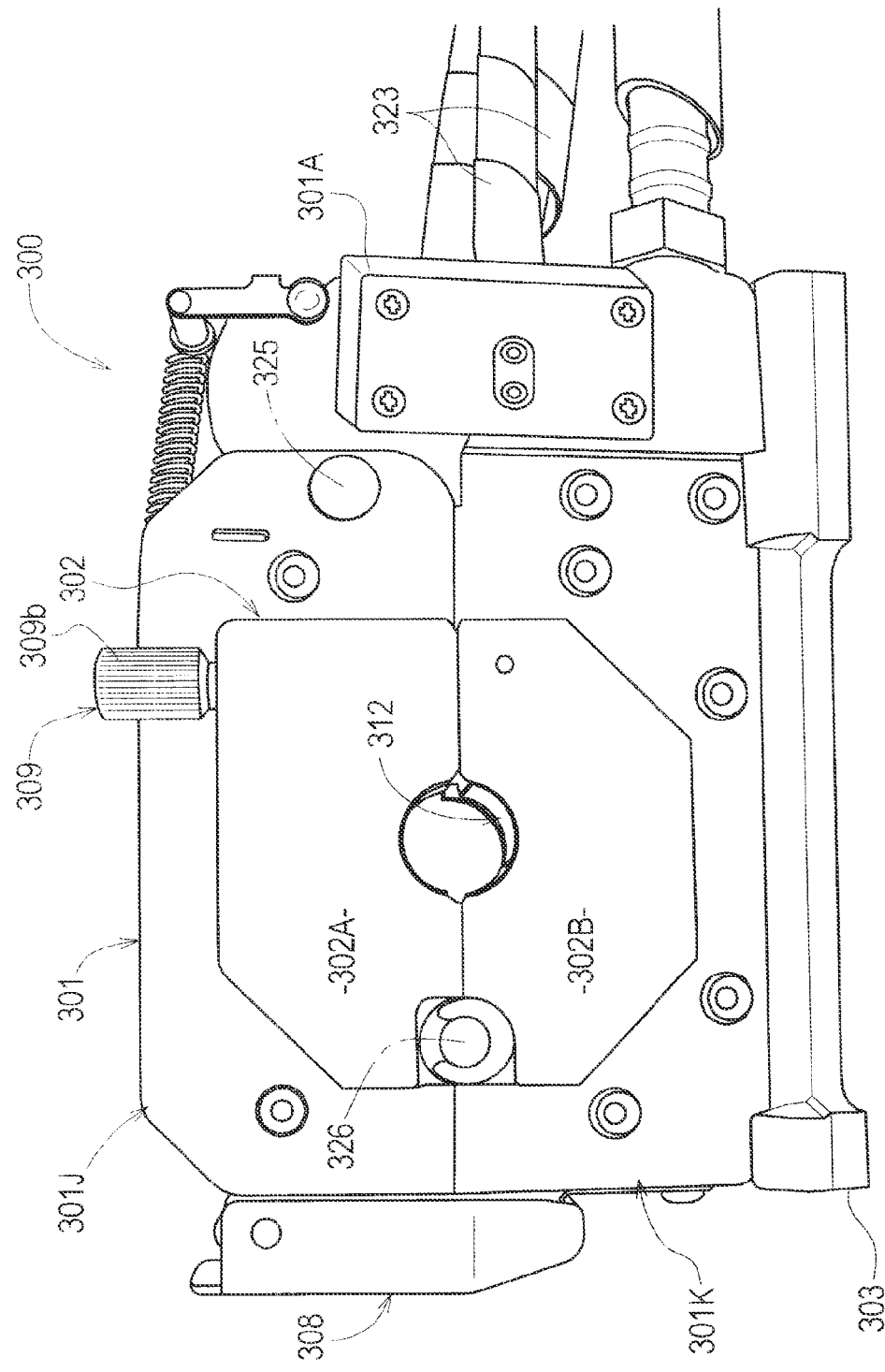
FIG. 16 is a front view (Embodiment 5) of an apparatus for welding a resin pipe.
Figure 17:
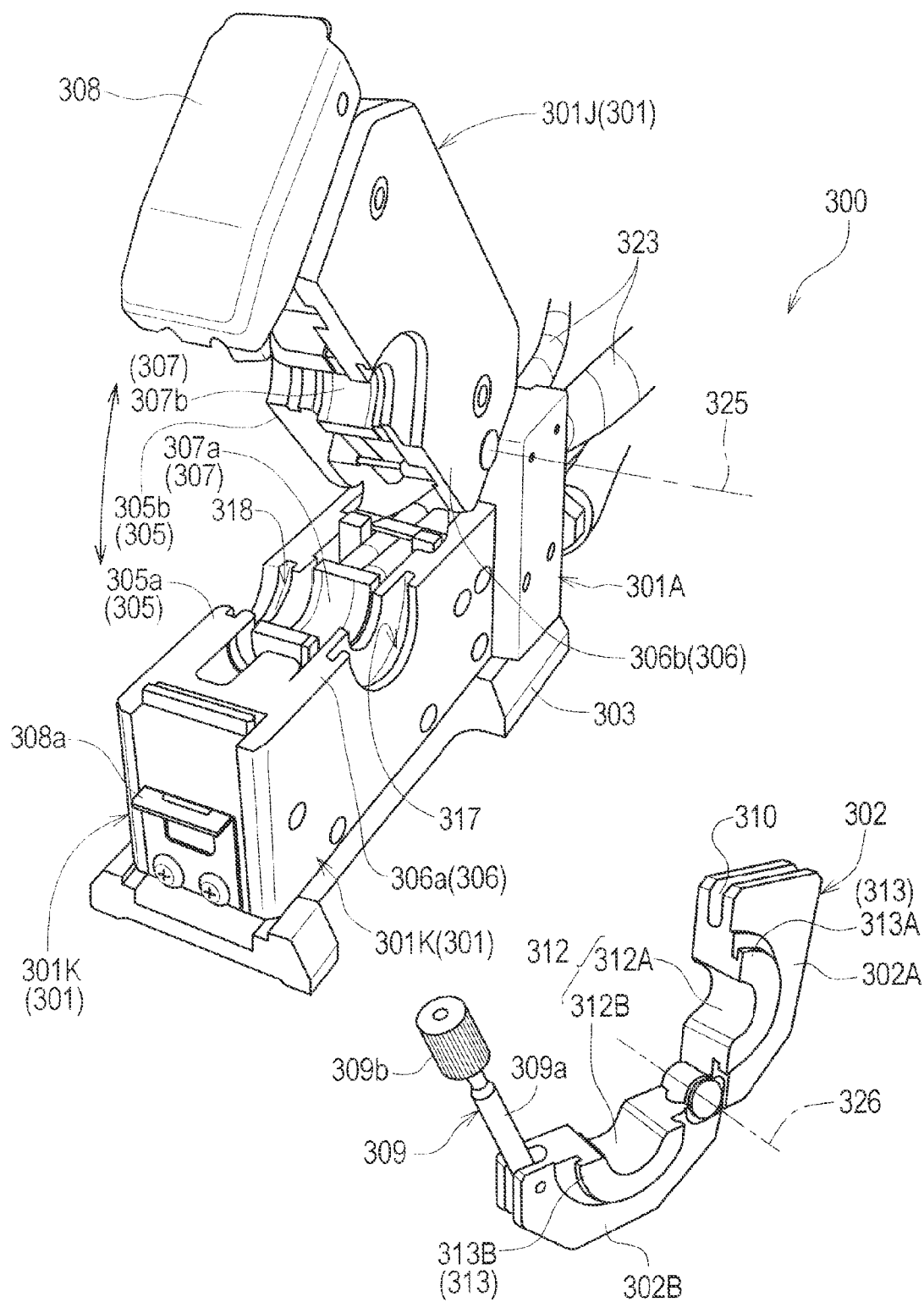
FIG. 17 is a perspective view of an apparatus body and tube holding device which are separated from each other.
Figure 18:
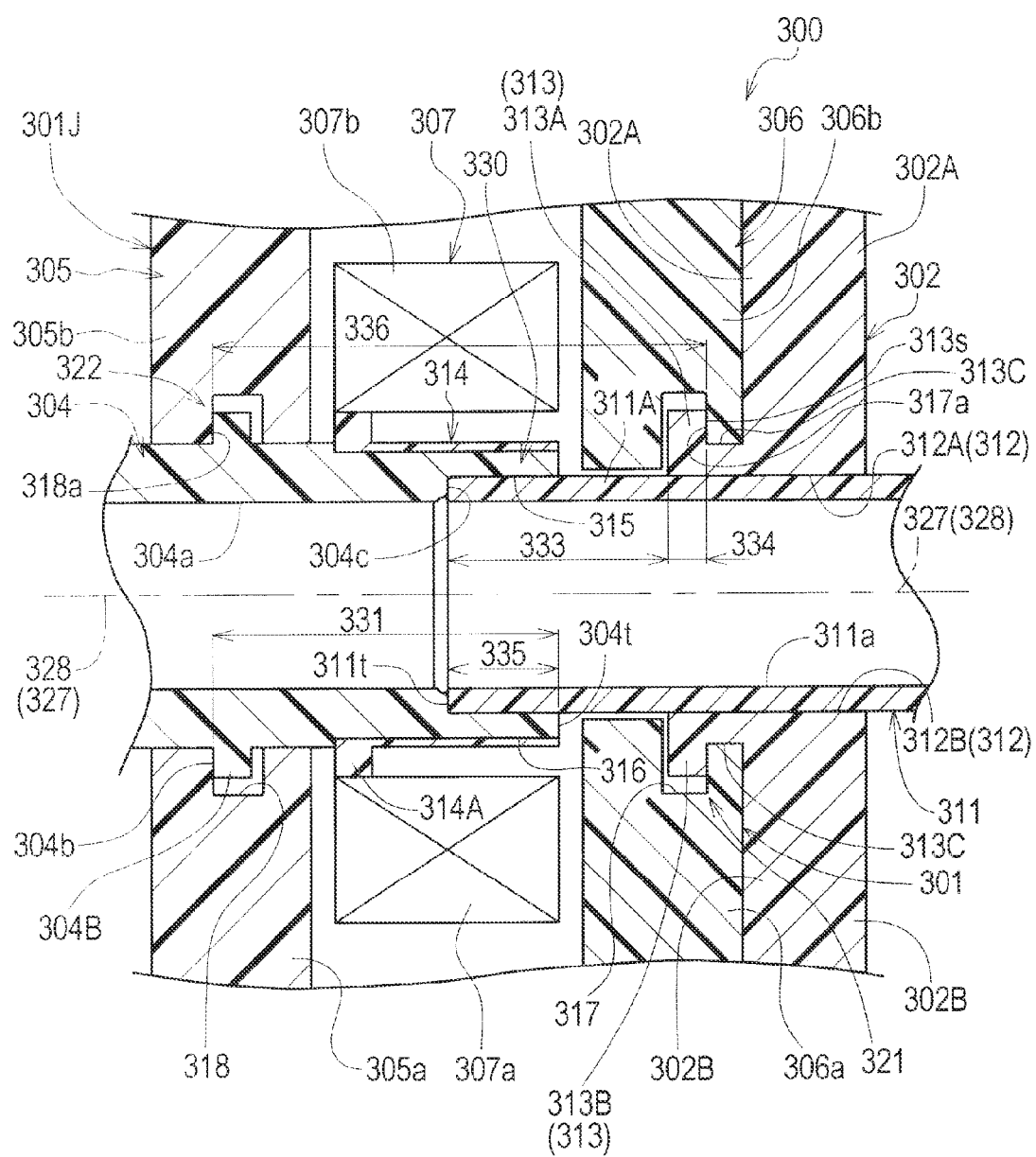
FIG. 18 is a sectional view schematically showing main portions of the welding apparatus in a welding step.

As shown in FIGS. 16 to 18, the resin pipe welding apparatus 300 is configured by: a welding apparatus body 301 having a lower structural member 301K having a leg portion 303, and an upper structural member 301J which is pivotally supported thereon by a lateral axis 325; and a clamp (tube holding device) 302 which is separated therefrom. The welding apparatus 300 heats a joining portion 330 that is a portion in which an end portion of a welding joint 304 and that of a tube 311 are inserted, thereby melting and integrating together. The welding apparatus body 301 is configured so as to sandwich and support a clamp 302 which surroundingly engages (grasps) the tube 311, and the welding joint 304 which is inserted into the tube 311 (see FIG. 18).

As shown in FIGS. 16 to 18, the welding apparatus body 301 is configured to have: a joint holding portion 305 which sandwiches the welding joint 304 to be engaged therewith; a clamp holding portion 306 which is engageable with the clamp 302 in a state where the relative position in the longitudinal direction of the tube is determined; a heating portion (heating means) 307 which is placed between the joint holding portion 305 and the clamp holding portion 306; a buckle 308 for engagingly holding the upper structural member 301J at a closed position where the member is downward swung; and the like. A apparatus basal portion 301A from which various lead wires 323 and the like are taken out is disposed on the side of the axis 325 in the lower structural member 301K, and an engagement piece 308a with which the buckle 308 is to be engaged is attached to the swing end (opposite to the axis 325).

The joint holding portion 305, the clamp holding portion (an example of an engaging portion) 306, and the heating portion 307 are configured by half-split lower portions 305a, 306a, 307a which are built in the lower structural member 301K, and half-split upper portions 305b, 306b, 307b which are built in the upper structural member 301J, respectively. FIGS. 16 and 18 show a welding action state in which the upper structural member 301J is downward swung and engaged with the lower structural member 301K by the buckle 308, and FIG. 17 shows an opened and waiting state in which the upper structural member 301J is upward swung. The opened and waiting state (FIG. 17) is an opened attitude in which the welding joint 304 and the clamp 302 are to be attached to and detached from the welding apparatus body 301, and the welding action state (FIG. 16) is a closed attitude in which the joining portion 330 is heated and welded.

As shown in FIGS. 16 to 19, the clamp 302 is configured by upper and lower half-split holding pieces 302A, 302B which are swingingly openable and closable about an axis 326. An engagement lever 309 for maintaining the clamp 302 to the closed state is pivotally coupled with an end portion of the lower half-split holding piece 302B which is opposite to the axis 326, and a vertical groove 310 into which a trunk portion 309a of the engagement lever 309 is to be inserted, and with which a head portion 309b having a diameter that is larger than it is to be engaged is formed in an end portion of the upper half-split holding piece 302A that is opposite to the axis 326. In the half-split holding pieces 302A, 302B, half-split inner circumferential surfaces 312A, 312B which form a grasping portion 312 for externally surrounding and holding the tube 311, and half-split ridges 313A, 313B which form an annular ridge 313 (described later) are formed.

FIGS. 16 and 19 show a grasping action state in which the upper half-split holding piece 302A is downward swung and engaged with the lower half-split holding piece 302B by the engagement lever 309, and FIG. 17 shows a coupling opened state in which the upper half-split holding piece 302A is upward swung. The coupling opened state (FIG. 17) is an opened attitude in which the tube 311 is attached to and detached from the clamp 302, and the grasping action state (FIG. 16) is a closed attitude in which the tube 311 is externally surrounded and engaged (grasped) by the grasping portion 312. The portion between the body portions of the half-split holding pieces 302A, 302B and the annular ridge 313 is formed as an annular clearance groove 313C having a small distance in the direction of the axis 327.

Figure 20:
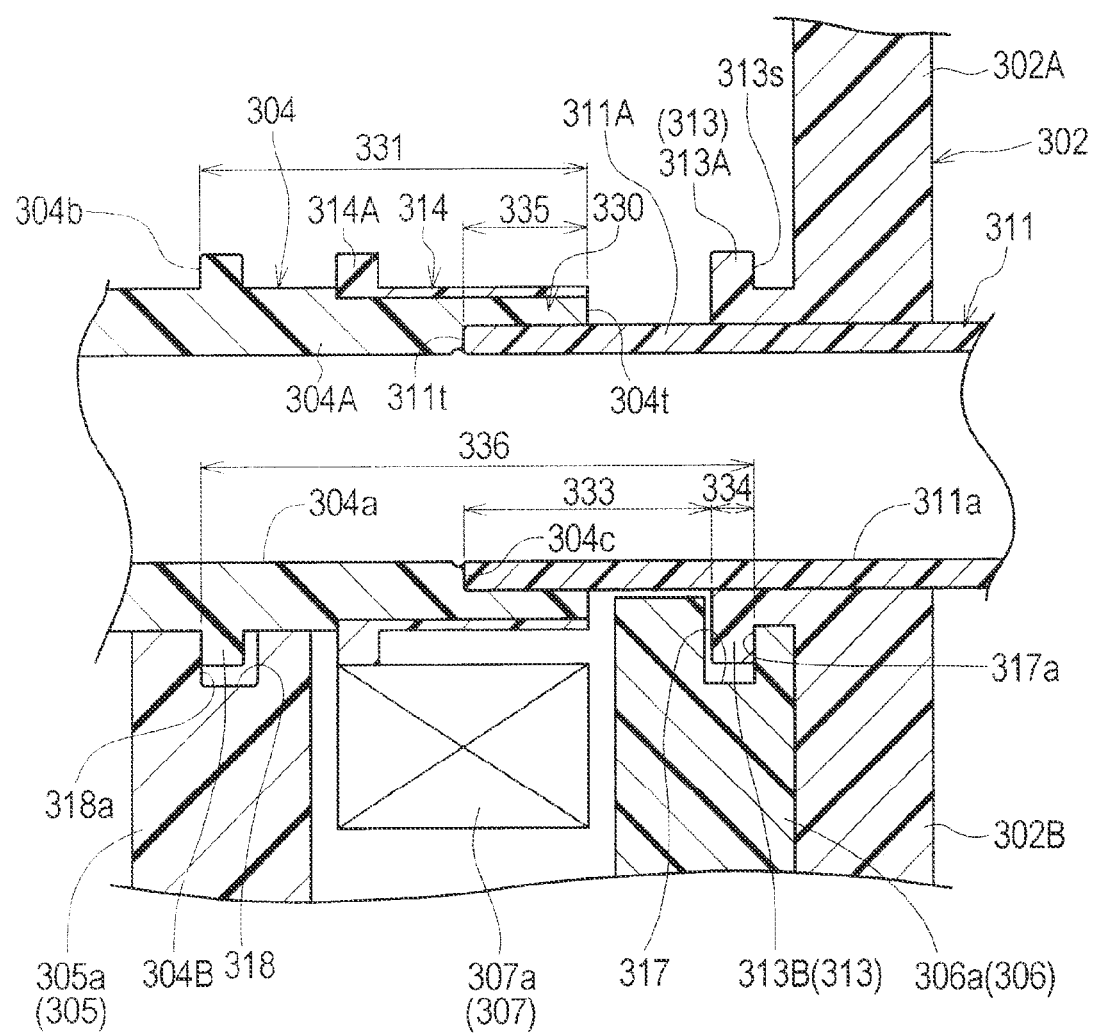
FIG. 20 is a functional view showing a setting step.
Figure 21:
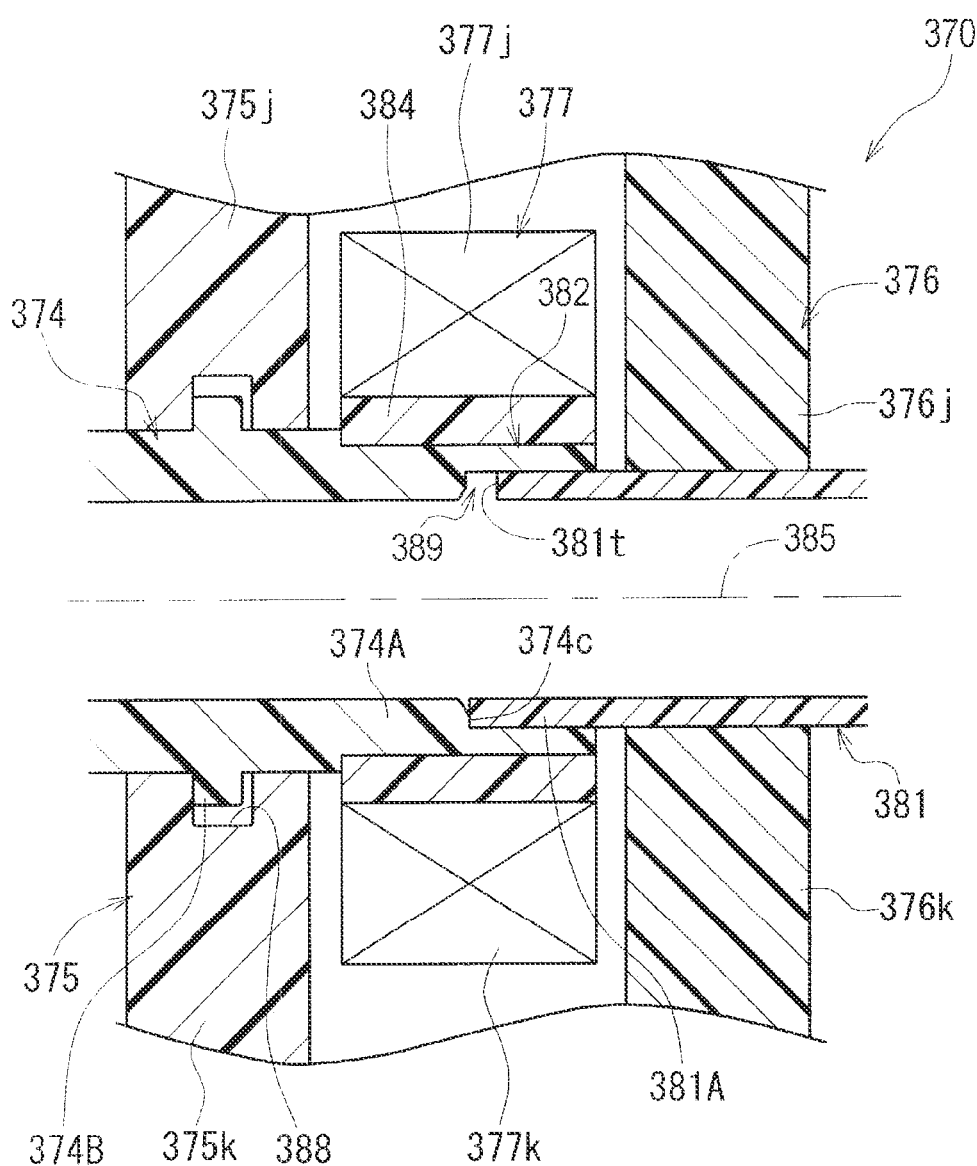
FIG. 21 is a sectional view schematically showing a conventional welding step and main portions of a welding apparatus in a state of the step.

As shown in FIGS. 18 to 20, the welding joint 304 is a cylindrical body which is made of a fluorine resin (an example of a synthetic resin), and which has: a pipe end portion 304A including an insertion inner circumferential portion 315 into which the tube 311 is to be fitted, and an attachment outer circumferential surface 316 onto which a holder (described later) 314 is to be fitted; an annular projection 304B which is formed in a place that is slightly separated from the pipe end portion 304A in the direction of the axis 328 (the direction of the axis 327) toward the inner deep side of the welding joint 304; and an inner flow path 304a. The holder 314 is a fluorine resin-made cylindrical member which is basically thin, and which has an annular thick end portion 314A that is projected in one end toward the radially outer side, and used while it is fitted and attached onto the attachment outer circumferential surface 316 of the welding joint 304.

As shown in FIGS. 18 to 20, the tube 311 is a pipe-like member which is made of a fluorine resin (an example of a synthetic resin), and which has an inner flow path 311a that has the same diameter as the inner flow path 304a of the welding joint 304. An end surface 311t of a tube end portion 311A which functions as the side of insertion to the welding joint 304 is formed as a vertical surface which forms just 90 deg. to the tube axis 327, by a previous cutting process or the like. The tube end portion 311A, and the pipe end portion 304A into which it is to be inserted constitute the joining portion 330 in which the members 311A, 304A are to be integrated with each other by welding.

As a result, the welding apparatus 300 has: the clamp 302 which is surroundingly engageable with the tube 311 in a place that is separated by a predetermined distance n from its end; the welding apparatus body 301 which is engageable with the clamp 302 in a state where a relative position in the longitudinal direction of the tube 311 is determined; and positioning means 321 which determines the relative position of the members 302, 301, has the heating portion 307 that externally surrounds the joining portion 330 in which the pipe end portion 304A of the synthetic resin-made welding joint 304 and the tube end portion 311A of the synthetic resin-made tube 311 are fitted together, and is configured so that the joining portion 330 is heated and melted by heating of the heating portion 307, to enable the pipe end portion 304A and the tube end portion 311A to be welded and integrated together.

The positioning means 321 which determines the relative position in the direction of the axis 327 (the tube longitudinal direction) of the clamp 302 and the welding apparatus body 301 in the clamp holding portion 306 in which the clamp 302 and the welding apparatus body 301 are relatively engaged is configured by distributing the annular ridge 313 and annular recess groove 317 which are fittable to each other, to the clamp 302 and the welding apparatus body 301. In Embodiment 5, the positioning means 321 is configured by forming the annular ridge 313 in the clamp 302 in a laterally projected state, and forming the annular recess groove 317 in the clamp holding portion 306 of the welding apparatus body 301. For example, means in which an annular ridge is disposed in the welding apparatus body 301 in a state where it is laterally projected therefrom, and an annular recess groove is disposed in the clamp 302 may be possible. In this case, however, the width dimension of the apparatus 300 tends to be increased as compared with the structure of Embodiment 5 shown in FIGS. 18 and 20.

As shown in FIGS. 17 and 18, a positioning mechanism 322 which causes the welding joint 304 to be externally surrounded and held by the welding apparatus body 301 in a state where the position in the direction of the axis 328 is determined is equipped. That is, the positioning mechanism 322 is configured by an annular projection 304B which is formed in the welding joint 304, and an annular groove 318 which is formed in the joint holding portion 305 of the welding apparatus body 301. When the annular projection 304B is fitted into the annular groove 318, namely, the distance 331 in the direction of the axis 328 between an inner deep side circumferential surface 304b of the annular projection 304B, and the pipe end face 304t is determined as the projection length from an outer circumferential surface 318a of the annular groove 318 in the direction of the axis 328.

Next, a welding method using the welding apparatus 300 will be described. First, the tube 311 is passed through the clamp 302 which is in the opened attitude or an attitude that is slightly opened from the closed state, and then a grasping step of downward swinging the upper half-split holding piece 302A, and inserting the engagement lever 309 into the vertical groove 310 to cause the tube 311 to be surroundingly engaged (grasped) with the clamp 302 as shown in FIG. 19(a) is performed. At this time, also a dimension setting step in which the distance between the end surface 313a of the annular ridge 313 and the tube end surface 311t in the direction of the axis 327 is set to have a predetermined value 333 is performed. Since the width (the dimension in the direction of the axis 327) of the annular ridge 313 is already set to 334, the distance (the dimension in the direction of the axis 327) between the inner side surface 313s of the annular ridge 313 and the tube end surface 311t is equal to 333+334.

As shown as a reference in FIG. 19(a), for example, the dimension setting step is preferably performed when a setting jig 319 is used, and, when the tube 311 is clamped while causing the tube end surface 311t to abut against a first abutting surface 319a, and the end surface 313a to abut against a second abutting face 319b, an operation of surroundingly engaging (grasping) the tube 311 with the clamp 302 in the state where the projection amount equals to the predetermined value 333 is easily performed. Although not illustrated, the dimension setting step may be performed by using a jig which directly measures the distance (333+334) between the inner side surface 313s of the annular ridge 313 and the tube end surface 311t.

Next, a joint inserting step is performed in which the welding joint 304 onto which the holder 314 is already externally attached is inserted into the projection end portion of the tube 311 from the annular ridge 313 to be fitted thereonto, and the pipe end portion 304A is attached onto the tube end portion 311A to fit the welding joint 304 and the tube 311 together as shown in FIG. 19(b), thereby perform provisional coupling. At this time, the insertion is tentatively performed until the end surface 311t of the tube 311 abuts against a step side surface 304c in the pipe end portion 304A. The fitting length between the welding joint 304 and the tube 311 in the state where the end surface 311t and the step side surface 304c abut against each other is 335.

When the provisional coupling is completed, a loading step in which the provisional coupled member of the tube 311 involving the clamp 302 and the welding joint 304 is placed and held on the lower structural member 301K is performed in a state where, as shown in FIG. 20, the annular projection 304B of the welding joint 304 is fitted into the annular groove 318 of the half-split lower portion 305a of the joint holding portion, and the annular ridge 313 (lower half-split ridge 313B) of the clamp 302 is fitted into the half-split lower portion 306a of the clamp holding portion 306.

Here, the distance (dimension in the direction of the axis 328) 336 between the outer circumferential surface 318a of the annular groove 318 and an outer circumferential surface 317a of the annular recess groove 317 is set to be equal to or extremely smaller than the distance dimension [dimension in the direction of the axis 328(327)] between the inner deep side circumferential surface 304b of the annular projection 304B, and the inner side surface 313s of the annular ridge 313 in the case of the normal insertion state where the end surface 311t and the step side surface 304c abut against each other (in other words, the state where the projection amount of the tube end portion 311A from the annular ridge 313 is 333). Namely, dimension 336=dimension 331+dimension 333+dimension 334−dimension 335 is set.

After the loading step, then, an attaching step is performed in which the upper structural member 301J that has been upward swung to be in the opened attitude is downward swung and moved, the buckle 308 is engagingly operated, and, as shown in FIG. 18, the tube 311 and welding joint 304 that are externally surrounded and held to the Welding apparatus body 301 by the clamp are attached to attain a weldable state. Then, a welding step is performed in which the heating portion 307 in the state where it is fitted onto the holder 314 is energized to generate heat, the joining portion 330 is heated through the holder 314 to be melted, and the tube end portion 311A and the pipe end portion 304A are welded and integrated with each other.

Namely, the method is a method of welding a resin pipe in which the clamp 302 which is surroundingly fixable to the tube 311, and the welding apparatus body 301 which is engageable with the clamp 302 in the state where the relative position in the longitudinal direction of the tube 311 is determined are prepared, the tube 311 is externally surrounded and engaged by the clamp 302 in a place that is separated by the predetermined distance (333) from its end (tube end surface 311t), and the joining portion 330 is heated and welded in the state where the clamp 302 which grasps the tube 311 is engaged with the welding apparatus body 301. In the welding method, the grasping step (including the dimension setting step)→the joint inserting step→the loading step→the attaching step→the welding step are performed in this sequence.

After the welding step, of course, a taking out step in which the upper structural member 301J is upward swung, and the joint integrated article (the welding joint 304 and tube 311 which are welded to each other) involving the clamp 302 is taken out, and a clamp removing step in which the clamp 302 is detached from the joint integrated article are performed. These taking out and clamp removing steps are not steps which are so complicated that they cannot be understood unless particularly described. Therefore, description in this detailedness is performed.

As described above, according to the resin pipe welding apparatus 300 and welding method, when the tube 311 is preliminarily attached to the clamp 302 according to the rule, welding can be performed in the normal insertion state where the tube end surface 311t and the step side surface 304c always abut against each other, in a step subsequent to the loading step shown in FIG. 20. Conventionally, there is a disadvantage that, although the extra step which is the step of checking and inserting the tube is necessary, the tube end surface and the step side surface are welded together while they are separated from each other, because of defectiveness of the checking and inserting step, or a fault in the setting step in which the tube is surrounded and held. Such a disadvantage at the timing when the tube 311 is set into the welding apparatus body 301 does not occur.

After setting of the predetermined projection distance 333 is once set when the tube 311 is surrounded and engaged by the clamp 302, welding and integration can be performed surely and rapidly while a subsequent work of checking the projection distance of the tube 311 from the clamp 302 is made absolutely unnecessary. Conventionally, after a tube is clamped and engaged by a welding apparatus, it is impossible to check whether the tube end surface and the step side surface are in the initial state or not. The invention is advantageous also in that, even after the tube 311 is surrounded and engaged (grasped) by the clamp 302, it is possible until the joint inserting step to recheck whether the projection distance of the tube end portion 311A is 333 or not.

Before loaded in the welding apparatus 300, in order to attain a correct dimension, the end surface 311t of the tube 311 is finish-processed into a flat surface which is perpendicular to the tube axis 327, by a dedicated processing machine or the like. In this case, the end surface is processed in a state where the tube 311 is clamped (grasped) by a clamp jig (clamp), and the clamp jig is set and held in the processing machine. Because of the ingenuity of the shape and structure of the welding apparatus body 301, the clamp jig is enabled to function also as the clamp 302 in the welding apparatus 300. Therefore, one dedicated jig can be omitted, and it is possible to contribute to cost reduction and reduction of the maintenance cost.

DESCRIPTION OF REFERENCE NUMERALS 1 tube
1T end portion
2 joint body
2T pipe end portion
3 holder
4 heating means
12 flange
13 holder outer circumferential surface
35 axis
41 expansion gap, radial gap
103 heating portion
104 pipe end portion
105 tube
106 end portion
107 inner circumferential surface 109 heat transmitting case
110 heating element (coil heater)
118 joining portion
120 welding joint
119 fulcrum
134 half-split heater
203 joint body portion
203a end surface
210 projection (annular ridge)
213 tube
213a end portion
214 heating means
255 axis
241 pipe end portion
243 thickness of joint body portion
244 recess groove (circumferential recess groove)
240 thickness of pipe end portion
301 welding apparatus body
302 clamp
304 welding joint
304A pipe end portion
306 engaging portion
307 heating portion
311 tube
311A tube end portion
311t tube end surface
313 annular ridge
317 annular recess groove
321 positioning means
327 tube axis
330 joining portion

The invention claimed is:

1. A welding joint,
said welding joint comprising a joint body, a synthetic resin-made tube and a synthetic resin-made holder, said joint body having a pipe end portion into which an end portion of said synthetic resin-made tube can be inserted and being configured so that said pipe end portion is welded to said end portion of said synthetic resin-made tube by heating of a heater which externally surrounds said pipe end portion, and
said synthetic resin-made holder having a body portion and a flange which are fitted and externally attached onto said pipe end portion so as to be positioned between said pipe end portion of said joint body and said heater, said flange being connected to said body portion so as to make it possible to ensure a radial expansion gap between said body portion and said heater, and an outer diameter of said flange attached onto said pipe end portion being larger than an outer diameter of said body portion attached onto said pipe end portion,
wherein an end surface, in a direction of an axis of said synthetic resin-made holder, of said body portion of said synthetic resin-made holder is coplanar with an end surface, in a direction of an axis of said joint body, of said pipe end portion.

2. The welding joint according to claim 1, wherein a radial thickness of said flange is set to 1.4 to 15 times a radial thickness of said body portion.

3. The welding joint according to claim 1, wherein a length of said holder in an axial direction of said holder is set to 2 to 10 times a length of said flange in the axial direction of said holder.

4. The welding joint according to claim 1, wherein a resin having a melting temperature which is higher than a melting temperature of a synthetic resin forming said pipe end portion is set as the synthetic resin forming said holder.

* * * * *